United States Patent [19]

Uchino et al.

[11] Patent Number: 5,594,081
[45] Date of Patent: Jan. 14, 1997

[54] CATALYST COMPONENT FOR THE POLYMERIZATION OF α-OLEFINS AND A PROCESS FOR PREPARING α-OLEFIN POLYMERS WITH USE OF SAME

[75] Inventors: Hideshi Uchino; June Endo, both of Yokkaichi; Toshihiko Sugano, Yokohama; Tomohiko Takahama, Yokkaichi; Taku Kato, Yokohama; Eiji Taniyama, Ami-machi; Naoshi Iwama, Yokohama, all of Japan

[73] Assignee: Mitsubishi Chemical Corporation, Tokyo, Japan

[21] Appl. No.: 504,825

[22] Filed: Jul. 20, 1995

[30] Foreign Application Priority Data

Jul. 22, 1994 [JP] Japan .................................. 6-171194

[51] Int. Cl.⁶ ...................................................... C08F 4/642
[52] U.S. Cl. ........................... 526/127; 526/160; 526/134; 526/943; 502/103; 502/117; 556/11; 556/53
[58] Field of Search ...................... 556/11, 53; 502/103, 502/117; 526/126, 127, 134, 160

[56] References Cited

PUBLICATIONS (1992) Chem Rev. 92, 965, 985, R L Hatterman.

*Primary Examiner*—Mark Nagumo
*Attorney, Agent, or Firm*—Oblon, Spivak, McClelland, Maier & Neustadt, P.C.

[57] ABSTRACT

The present invention provides a catalyst for polymerizing an α-olefin which is capable of producing an α-olefin polymer having a high molecular weight in a high yield under the polymerization conditions including at high temperature, and a process for preparing an α-olefin polymer, which catalyst comprises a Component (A) which comprises a coordination compound having a skeleton of a metallocene compound comprising an indenyl ring or a hydroindenyl ring which is an indenyl having a six-membered portion hydrogenated as a ligand and having Ti, Zr or Hf as a metal component in combination with a Component (B) which is, for example, an alumoxane. The coordination compound is crosslinked at the six-membered rings characterized by the fact that two of the indenyl or hydroindenyl groups are crosslinked at the six-membered ring of the indenyl or hydroindenyl group.

14 Claims, No Drawings

CATALYST COMPONENT FOR THE POLYMERIZATION OF α-OLEFINS AND A PROCESS FOR PREPARING α-OLEFIN POLYMERS WITH USE OF SAME

BACKGROUND OF THE INVENTION

1. Field of the Invention

The present invention relates to a novel catalyst component for polymerizing α-olefins. More particularly, the present invention relates to a catalyst component for polymerization which makes possible the production of an industrially useful α-olefin polymer, a catalyst for polymerizing an α-olefin with the catalyst component, and a process for preparing an α-olefin polymer with use of the catalyst.

2. Background Art

As the homogeneous catalysts for polymerizing α-olefins, there is known the so-called Kaminsky catalyst. This type of the catalyst has an extremely high activity and a narrow molecular weight distribution, and it is also characterized in that a polymer having a narrow distribution of a monomer composition is obtained in copolymerization.

Transition metal compounds used in the preparation of α-olefin polymer with the Kaminsky catalyst is classified roughly into those types of non-crosslinked and crosslinked ligands.

As the typical example of the non-crosslinked complex, there is disclosed biscyclopentadienylzirconium dichloride in Japanese Patent Laid-Open Publication No. 19309/1983, but this catalyst seems to have a drawback that when ethylene-1-hexene copolymer is prepared at a polymerization temperature of a practical level, increased content of hexene leads to decrease in the molecular weight whereby the polymer species obtainable thereby may be limited.

As the typical examples of the crosslinked complex, there are disclosed ethylene-1,2-bis(1-indenyl)zirconium dichloride and ethylene-1,2-bis(1-(4,5,6,7-tetrahydroindenyl))zirconium dichloride in Japanese Patent Laid-Open Publication No. 130314/1986, but these compounds also seem to have a drawback which is similar to that in the non-crosslinked complex. It has also been proposed for the crosslinked complex to change its substituent structure so as to make the complex suited for the production of an α-olefin polymer having a high molecular weight in Japanese Patent Laid-Open Publication Nos. 268307/1992 and 268308/1992. The catalysts so modified do not appear to have improved performance at elevated temperatures which are economically advantageous.

All of these crosslinked complexes have a structure that a crosslinking group is directly linked to a five-membered ring in the ligand, and no examples of syntheses of the complex in which the crosslinking group is bonded to the portion other than the five-membered ring have been reported insofar as the present inventors know.

The object of the present invention is to provide a novel catalyst component for polymerizing an α-olefin which makes possible the production of an industrially useful α-olefin polymer in a high yield, a catalyst for polymerizing an α-olefin, and a process for producing an α-olefin polymer.

SUMMARY OF THE INVENTION

The present invention has been done for the purpose of solving the above described drawbacks.

The present invention provides a novel catalyst component for polymerizing an α-olefin which comprises a metallocene compound represented by the formulae $[I_A]$ or $[I_B]$:

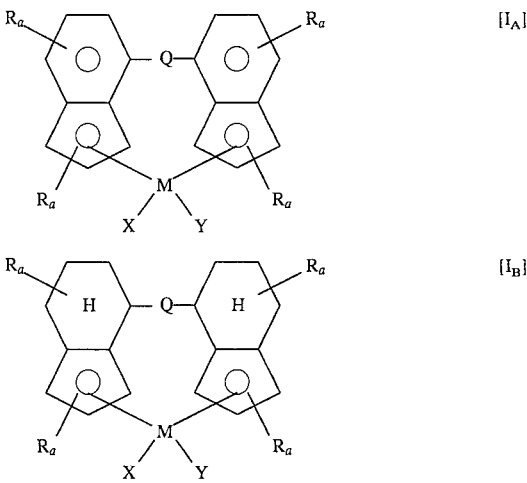

wherein:

M represents a transition metal selected from the group consisting of titanium, zirconium and hafnium;

R's, respectively, represent independently a halogen atom, a hydrocarbon group having 1–20 carbon atoms, a halogen-containing hydrocarbon group having 1–20 carbon atoms, or a silicon-containing hydrocarbon group having 1–20 carbon atoms, with a proviso that, when two or more of R's are on the identical indenyl or hydroindenyl group, R's can be bonded to each other at their ω-terminals to form a ring together with a part of the indenyl or hydroindenyl group;

a's, respectively, denote independently an integer from 0 to 3, and b's, respectively, denote independently an integer from 0 to 7;

Q represents a divalent hydrocarbon or silicon- or germanium-containing hydrocarbon group having 1–30 carbon atoms; and X and Y, respectively, represent independently a hydrogen atom, a halogen atom, or a monovalent hydrocarbon or nitrogen-, oxygen-, silicon- or phosphorus-containing hydrocarbon group having 1–20 carbon atoms.

The present invention also provides a catalyst for polymerizing an α-olefin which comprises a combination of the above described catalyst component for polymerizing an α-olefin, Component (A), and Component (B) which is (i) an aluminumoxy compound, (ii) a Lewis acid, or (iii) an ionic compound capable of reacting with the Component (A) to convert the Component (A) into a cation.

Furthermore, the present invention relates to a process for preparing an α-olefin polymer with use of the catalyst described above.

The present invention thus provides a process for producing an α-olefin polymer which comprises contacting an α-olefin with a catalyst comprising a combination of the above described Components (A) and (B).

With the catalyst component of the present invention, it is possible to produce an industrially useful α-olefin polymer in a high yield. It is also possible to prepare a high molecular weight or stereoregular α-olefin polymer under a highly economical polymerization condition at a high temperature depending on the structure and/or position of the crosslinking group (Q) or substituents selected.

Although the reason why the effect inherent in the present invention is exhibited remains ambiguous, it is assumed that when the complexes are crosslinked at their rings other than the 5-membered rings, these rings are fixed to form a configuration different from that of the known non-crosslinked complexes or of complexes crosslinked at their 5-membered rings, whereby the structural change under the polymerization condition at a high temperature may be made difficult thus suppressing the decrease of the molecular weight or exhibiting the stereospecific activity.

These features and effects inherent in the present invention are considered to be extraordinary from the conventional techniques.

DETAILED DESCRIPTION OF THE PREFERRED EMBODIMENT OF THE INVENTION

The present invention relates to the catalyst component comprising the compound specified in the Component (A) below. Furthermore, the present invention relates to a catalyst for polymerizing an α-olefin comprising a combination of the Component (A) and the Component (B) described below, and a process for producing an α-olefin polymer comprising contacting an α-olefin with the catalyst thereby to polymerize the α-olefin. The terms "comprising" and "comprising a combination" herein mean that compounds or ingredients other than those specified may also be used in combination, insofar as the effect of the present invention will not be impaired.

<Component (A)>

The catalyst component, Component (A), of the present invention comprises the transition metal compound represented by the formulae [$I_A$] or [$I_B$]:

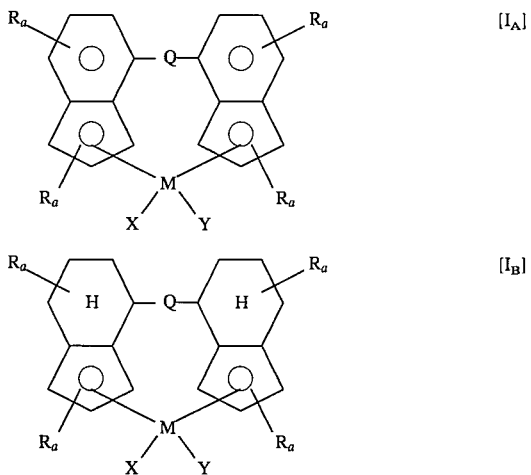

wherein:

M represents a transition metal selected from the group consisting of titanium, zirconium and hafnium;

R's, respectively, represent independently a halogen atom, a hydrocarbon group having 1–20 carbon atoms, a halogen-containing hydrocarbon group having 1–20 carbon atoms, or a silicon-containing hydrocarbon group having 1–20 carbon atoms with a proviso that, when two or more R's are on the identical indenyl or hydroindenyl group, R's can be bonded to each other at their ω-terminals to form a ring together with a part of the indenyl or hydroindenyl group;

a's, respectively, denote independently an integer from 0 to 3, and b's, respectively, denote independently an integer from 0 to 7;

Q represents a divalent hydrocarbon or silicon- or germanium-containing hydrocarbon group having 1–30 carbon atoms; and X and Y, respectively, represent independently a hydrogen atom, a halogen atom, or a monovalent hydrocarbon or nitrogen-, oxygen-, silicon- or phosphorus-containing hydrocarbon group having 1–20 carbon atoms.

R's, as shown above, represent respectively, a halogen atom, a hydrocarbon group having 1–20, preferably 1–14 carbon atoms, a halogen-containing hydrocarbon group having 1–20, preferably 1–14 carbon atoms, or a silicon-containing hydrocarbon group having 1–20, preferably 1–14 carbon atoms. More particularly, each R represents (i) fluorine, chlorine, or bromine, (ii) a saturated hydrocarbon group such as alkyl or cycloalkyl, (iii) an unsaturated hydrocarbon group such as vinyl or an alkenyl, (iv) an aromatic hydrocarbon group such as an aryl, (v) a halogenated saturated hydrocarbon group such as a chloroalkyl or a fluoroalkyl, (vi) a halogenated aromatic hydrocarbon group such as a chloroaryl, (vii) a halogenated unsaturated hydrocarbon group such as chlorovinyl or fluorovinyl, or (viii) a silicon-containing hydrocarbon group such as an alkylsilyl, or the like.

As is apparent from the formulae [$I_A$] or [$I_B$], the transition metal compound is first of all a metallocene compound having as a ligand indenyl or hydroindenyl group, i.e., an indenyl group of which the six-membered portion has been hydrogenated. The metallocene compound has a substituent R on the five-membered ring and/or six-membered ring of the indenyl or hydroindenyl. When two or more R's are present on the rings, these R's may be the same or different, as is apparent from the definition of R.

In addition, the metallocene compound is distinguished from the conventional metallocene compounds in that the compound crosslinked between its ligands has a crosslinking group Q lying between the six-membered rings of the indenyl or hydroindenyl group.

On the other hand, the basic skeleton of a metallocene compound having indenyl or hydroindenyl group as a ligand, a transition metal M as a metal ingredient, and groups X and Y which are bonded to the metal M, wherein M, X and Y have the same meanings as defined above, is known.

The indenyl or hydroindenyl group has a substituent R, and the specific examples of R preferably include methyl, ethyl, propyl, isopropyl, n-butyl, isobutyl, tert-butyl, n-amyl, isoamyl, n-hexyl, cyclopropyl, cyclopentyl, allyl, phenyl, benzyl, 1-naphthyl, 2-naphthyl, trimethylsilyl, trifluoromethyl, pentafluorophenyl, and the like.

It has already been described above that when two or more R's are present, two or integral times of two of R's can be bonded to each other at their ω-terminals. Specific examples of the divalent group comprising two R's which are bonded to each other at their ω-terminals include ethylene, trimethylene, tetramethylene, 1-methyltetramethylene, 2-methyltetramethylene, 1,2-dimethyltetramethylene, 1-trimethylsilyltetramethylene, 2-trimethylsilyltetramethylene, 1,3-butadiene-1,4-diyl, 1,3-pentadiene-1,4-diyl, 2-methyl-1,3-butadiene-1,4-diyl,1-phenyl-1,3-butadiene-1,4-diyl, 2-phenyl-1,3-butadiene-1,4-diyl, and the like.

Q is a divalent group crosslinking two indenyl or hydroindenyl groups at their six-membered ring portions, and represents (i) a divalent hydrocarbon group having 1–30, preferably 1–6 carbon atoms, more particularly a saturated or unsaturated hydrocarbon group such as an alkylene group, a cycloalkylene group or an arylene group, (ii) a silylene group, (iii) a silylene group having 1–20, preferably 1–12 carbon atoms, (iv) a germylene group, or (v) a germylene group having 1–20, preferably 1–12 carbon atoms. Among these groups, preferred are an alkylene group, a cycloalkylene group, an arylene group, and a alkylsilylene group. In this connection, the distance between the bonding terminals of the divalent group Q is, regardless of the total carbon atoms, preferably about 4 atoms or less, above all, 3 atoms or less when the group Q is of chain, and the cyclic group plus about 2 atoms or less, above all, only the cyclic group when the group Q is the one comprising a cyclic group. Thus, when the group Q is the alkylene group, it is preferably ethylene and isopropylidene, of which the distances between the bonding terminals is 2 atoms and 1 atom, respectively; when the group Q is the cycloalkylene group, it is preferably cyclohexylene, of which the distance between the bonding terminals is only the cyclohexylene group; and when the group Q is the alkylsilylene group, it is preferably heptamethyltetrasilylene, hexamethyltrisilylene, tetramethyldisilylene or dimethylsilylene, of which the distance between the bonding terminals is 4, 3, 2 and 1 atoms, respectively.

X and Y, which may be the same or different, respectively, represent independently (i) a hydrogen atom, (ii) a halogen atom, viz. fluorine, chlorine, bromine or iodine, preferably chlorine, (iii) a hydrocarbon group having 1–20 carbon atoms, (iv) an oxygen-containing hydrocarbon group having 1–20 carbon atoms, (v) a nitrogen-containing hydrocarbon group having 1–20 carbon atoms, (vi) a silicon-containing hydrocarbon group having 1–20 carbon atoms, (vii) a silicon- and oxygen-containing hydrocarbon group having 1–20 carbon atoms, and (viii) a phosphorus-containing hydrocarbon group having 1–20 carbon atoms. The oxygen atom of the oxygen-containing hydrocarbon group may be in an alkoxy bonding, an ether bonding, a ketone bonding or an ester bonding, and the group may contain one or more oxygen atoms. The preferred are those having one oxygen atom which is preferably in an alkoxy group.

The nitrogen atom of the nitrogen-containing hydrocarbon group may be in an amino group or a nitrile group, and the group may contain one or more nitrogen atoms. The preferred are those having one nitrogen atom which is more preferably in an amino, namely alkylamino groups. The silicon-containing hydrocarbon group may contain one or more silicon atoms, and the preferred are those having one silicon atom, more preferably alkylsilyl groups. The silicon- and oxygen-containing hydrocarbon group may contain one or more silicon and oxygen atoms, and the preferred are those having one silicon atom and one oxygen atom, more preferably alkylsiloxy groups. The phosphorus-containing hydrocarbon group may contain one or more phosphorus atoms, and the preferred are those having one phosphorus atom, more preferably alkylphosphide groups.

M represents titanium, zirconium or hafnium, preferably titanium or zirconium.

The compound of the present invention $[I_A]$ or $[I_B]$ can be synthesized by any appropriate methods suitable for the formation of the substituents and/or bondings. Typical synthetic routes are shown as follows.

Method A:

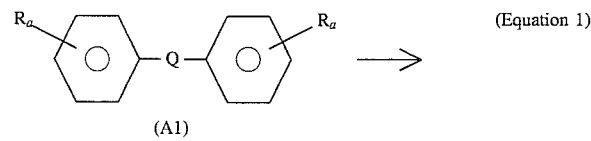

(A1)

(Equation 1)

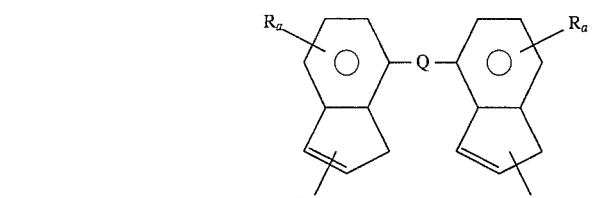

(A2)

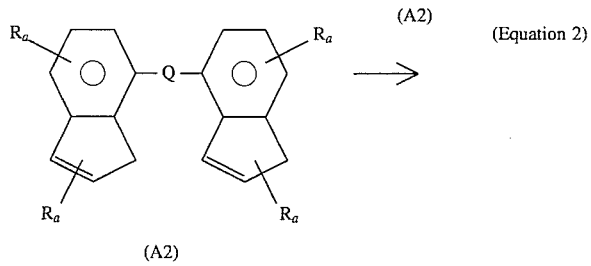

(A2)

(Equation 2)

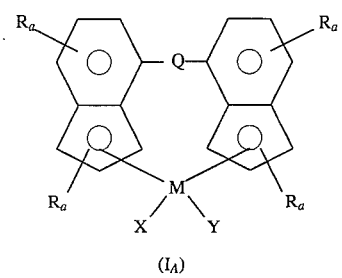

($I_A$)

Method B:

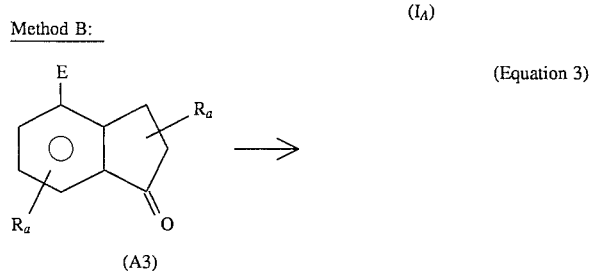

(A3)

(Equation 3)

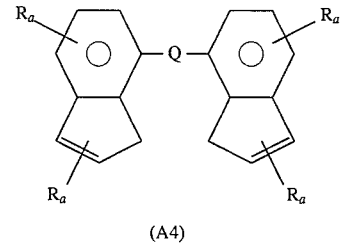

(A4)

wherein E represents a leaving group such as a halogen atom.

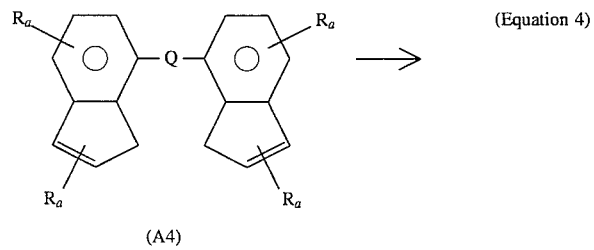

(A4)

(Equation 4)

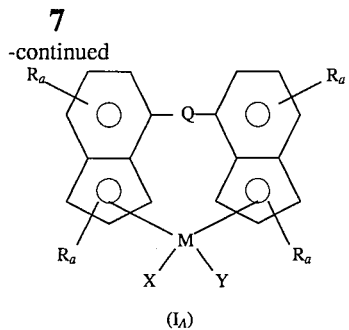

(I_A)

Method C:

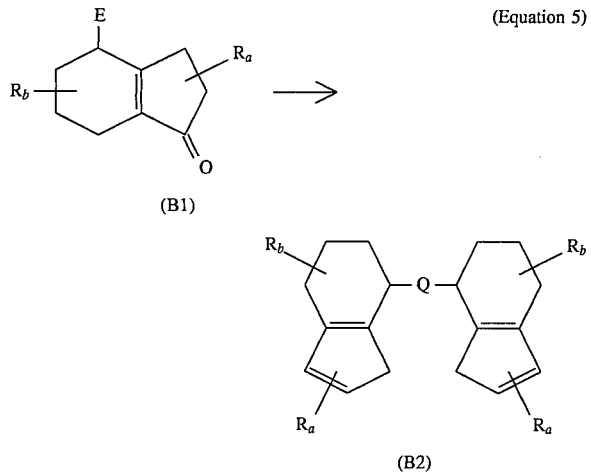

wherein E has the same meaning as defined above.

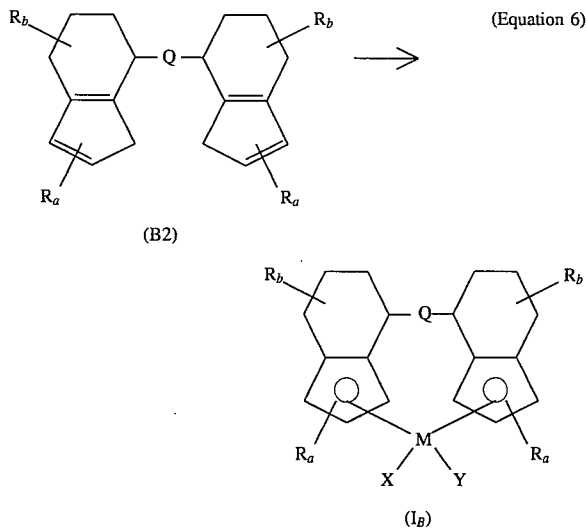

The compound (A1) in the Method A is commercially available or can be prepared by reducing the corresponding enone which is obtained in the same manner as described in, for example, Organic Synthesis Coll. Vol. 1, p.78. The compound (A1) is subjected to the treatment in the same manner as described in, for example, EP 0545304A1 to obtain a bisindanone derivative, which is subjected to the reduction of the carbonyl group followed by the dehydration to give the compound (A2) (Equation 1). The compound (A2) can be lithionized in the similar manner to that described in, for example, Japanese Patent Laid-Open Publication No.43616/1993 and then reacted with a metal halide such as $MXYCl_2$ to give the compound ($I_A$) (Equation 2).

The compound (A3) in the Method B can be prepared in the same manner as described in, for example, Synthesis, 1980 (3), p. 222. The carbonyl group of the compound (A3) is converted into ethylene ketal in the same manner as described in, for example, Organic Synthesis Coll. Vol. V, p. 303, and further led into a bisindane compound in the similar manner to that described in, for example, J. Amer. Chem. Soc., 80, 1883 (1958), which is treated with an acid and subjected to reduction and dehydration to give the compound (A4) (Equation 3). The compound (A4) can be converted into the compound ($I_A$) in the same manner as specified in Equation (2) (Equation 4).

The compound (B1) in the Method C can also be converted into the compound ($I_B$) in the same manner as in the method B.

The transition metal compounds described above include, but are not limited to, those described below. In this connection, when an asymmetric carbon atom occurs in the 4,5,6,7-tetrahydroindene compounds due to the presence of the substituent R, the compounds enlisted herein below should refer to one or the mixture of the stereoisomers, unless otherwise specified. Two indene or hydroindene ligands having the substituent R should refer to one or the mixture of the stereoisomers including those symmetric and unsymmetric with relation to the plane including M, X and Y, unless otherwise specified in context on their relative positions with respect to the group Q.

Specific examples of the metallocene compounds represented by the formulae [$I_A$] and [$I_B$] are listed in the following tables.

TABLE 1

Compound represented by the formula [I$_A$], wherein the compound No. 1, for example, refers to ethylene-1,2-bis(4-indenyl)-zirconium dichloride.

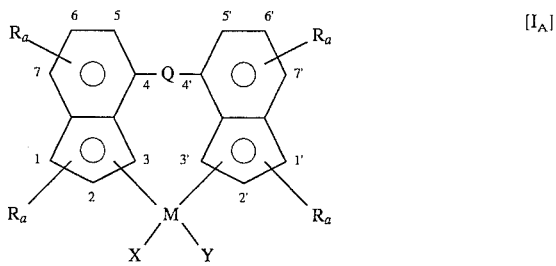

M = Zr, X = Y = Cl

| No. | Q | Five-membered ring | | Six-membered ring | |
|---|---|---|---|---|---|
| 1 | —CH$_2$CH$_2$— | — | — | — | — |
| 2 | —CH$_2$CH$_2$— | 2,2' | methyl | — | — |
| 3 | —CH$_2$CH$_2$— | 2,2' | ethyl | — | — |
| 4 | —CH$_2$CH$_2$— | 2,2' | isopropyl | — | — |
| 5 | —CH$_2$CH$_2$— | 2,2' | tert-butyl | — | — |
| 6 | —CH$_2$CH$_2$— | 2,2' | trimethylsilyl | — | — |
| 7 | —CH$_2$CH$_2$— | 2,2' | phenyl | — | — |
| 8 | —CH$_2$CH$_2$— | 2,2' | 1-naphthyl | — | — |
| 9 | —CH$_2$CH$_2$— | 2,2' | 2-naphthyl | — | — |
| 10 | —CH$_2$CH$_2$— | 2,2' | cyclohexyl | — | — |
| 11 | —CH$_2$CH$_2$— | 2,2' | fluoro | — | — |
| 12 | —CH$_2$CH$_2$— | 2,2' | trifluoromethyl | — | — |
| 13 | —CH$_2$CH$_2$— | 2,2' | pentafluorophenyl | — | — |
| 14 | —CH$_2$CH$_2$— | 2,2' | cyclopropyl | — | — |
| 15 | —CH$_2$CH$_2$— | 2,2' | cyclopentyl | — | — |
| 16 | —CH$_2$CH$_2$— | 2,2' | benzyl | — | — |
| 17 | —CH$_2$CH$_2$— | 2,2' | phenyldimethylcarbyl | — | — |
| 18 | —CH$_2$CH$_2$— | 2,2' | methyl | 7,7' | methyl |
| 19 | —CH$_2$CH$_2$— | 2,2' | phenyl | 7,7' | tert-butyl |
| 20 | —CH$_2$CH$_2$— | 2,2' | phenyl | 7,7' | phenyl |
| 21 | —CH$_2$CH$_2$— | 2,2' | phenyl | 7,7' | 1-naphthyl |
| 22 | —CH$_2$CH$_2$— | 1,1' | 1-naphthyl | — | — |
| 23 | —CH$_2$CH$_2$— | 1,1' | 2-naphthyl | — | — |
| 24 | —CH$_2$CH$_2$— | 3,3' | methyl | — | — |
| 25 | —CH$_2$CH$_2$— | 3,3' | ethyl | — | — |
| 26 | —CH$_2$CH$_2$— | 3,3' | phenyl | — | — |
| 27 | >SiMe$_2$ | 2,2' | methyl | — | — |
| 28 | >SiMe$_2$ | 2,2' | ethyl | — | — |
| 29 | >SiMe$_2$ | 2,2' | isopropyl | — | — |
| 30 | >SiMe$_2$ | 2,2' | tert-butyl | — | — |
| 31 | >SiMe$_2$ | 2,2' | trimethylsilyl | — | — |
| 32 | >SiMe$_2$ | 2,2' | phenyl | — | — |
| 33 | >SiMe$_2$ | 2,2' | 1-naphthyl | — | — |
| 34 | >SiMe$_2$ | 2,2' | 2-naphthyl | — | — |
| 35 | >SiMe$_2$ | 2,2' | cyclohexyl | — | — |

TABLE 1-continued

Compound represented by the formula [I$_A$], wherein the compound No. 1, for example, refers to ethylene-1,2-bis(4-indenyl)-zirconium dichloride.

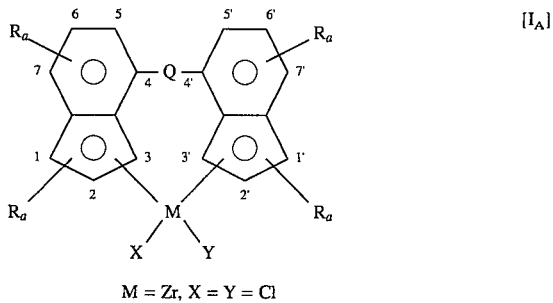

M = Zr, X = Y = Cl

| No. | Q | | R | | |
|---|---|---|---|---|---|
| | | Five-membered ring | | Six-membered ring | |
| 36 | >SiMe$_2$ | 2,2' | benzyl | — | — |
| 37 | >SiMe$_2$ | 2,2' | phenyldimethylcarbyl | — | — |
| 38 | >SiMe$_2$ | 2,2' | fluoro | — | — |
| 39 | >SiMe$_2$ | 2,2' | trifluoromethyl | — | — |
| 40 | >SiMe$_2$ | 2,2' | pentafluorophenyl | — | — |
| 41 | >SiMe$_2$ | 2,2' | cyclopropyl | — | — |
| 42 | >SiMe$_2$ | 2,2' | cyclopentyl | — | — |
| 43 | SiMe$_2$< | 1,1' | phenyl | — | — |
| 44 | SiMe$_2$< | 1,1' | 1-naphthyl | — | — |
| 45 | SiMe$_2$< | 1,1' | 2-naphthyl | — | — |
| 46 | SiMe$_2$< | — | — | — | — |
| 47 | —(CH$_2$)$_3$— | 2,2' | methyl | — | — |
| 48 | —(CH$_2$)$_3$— | 2,2' | methyl | 7,7' | methyl |
| 49 | —(CH$_2$)$_3$— | 2,2' | phenyl | 7,7' | methyl |
| 50 | —(CH$_2$)$_3$— | 2,2' | phenyl | — | — |
| 51 | MePhSi< | 2,2' | isopropyl | — | — |
| 52 | MePhSi< | 2,2' | tert-butyl | — | — |
| 53 | MePhSi< | 2,2' | trimethylsilyl | — | — |
| 54 | MePhSi< | 2,2' | phenyl | — | — |
| 55 | MePhSi< | 2,2' | 1-naphthyl | — | — |

TABLE 1-continued

Compound represented by the formula [I$_A$], wherein the compound No. 1, for example, refers to ethylene-1,2-bis(4-indenyl)-zirconium dichloride.

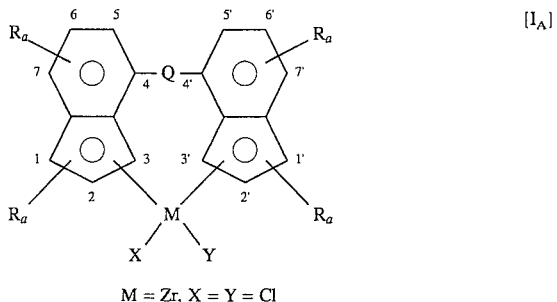

$M = Zr, X = Y = Cl$

| No. | Q | R Five-membered ring | | R Six-membered ring | |
|---|---|---|---|---|---|
| 56 | MePhSi< | 2,2' | 2-naphthyl | — | — |
| 57 | Ph$_2$Si< | 2,2' | isopropyl | — | — |
| 58 | Ph$_2$Si< | 2,2' | tert-butyl | — | — |
| 59 | Ph$_2$Si< | 2,2' | trimethylsilyl | — | — |
| 60 | Ph$_2$Si< | 2,2' | phenyl | — | — |
| 61 | Ph$_2$Si< | 2,2' | 1-naphthyl | — | — |
| 62 | Ph$_2$Si< | 2,2' | 2-naphthyl | — | — |
| 63 | Me$_2$Si< | — | — | 7,7' | methyl |
| 64 | Me$_2$Si< | — | — | 7,7' | isopropyl |
| 65 | Me$_2$Si< | — | — | 7,7' | tert-butyl |
| 66 | Me$_2$Si< | — | — | 7,7' | trimethylsilyl |
| 67 | Me$_2$Si< | — | — | 7,7' | phenyl |
| 68 | Me$_2$Si< | — | — | 7,7' | 1-naphthyl |
| 69 | Me$_2$Si< | — | — | 7,7' | 2-naphthyl |
| 70 | —CH$_2$CH$_2$— | — | — | 7,7' | tert-butyl |
| 71 | —CH$_2$CH$_2$— | — | — | 7,7' | trimethylsilyl |
| 72 | —CH$_2$CH$_2$— | — | — | 7,7' | phenyl |
| 73 | —CH$_2$CH$_2$— | — | — | 7,7' | 1-naphthyl |
| 74 | —CH$_2$CH$_2$— | — | — | 7,7' | 2-naphthyl |
| 75 | MePhSi< | — | — | 7,7' | tert-butyl |

TABLE 1-continued

Compound represented by the formula [I_A], wherein the compound No. 1, for example, refers to ethylene-1,2-bis(4-indenyl)-zirconium dichloride.

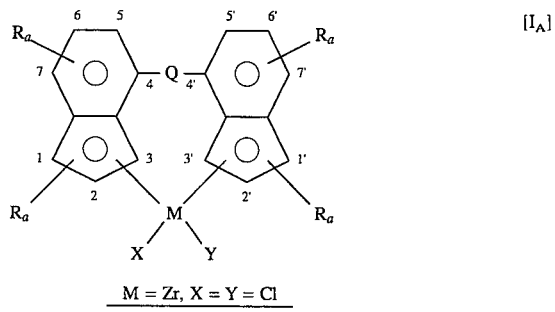

M = Zr, X = Y = Cl

| No. | Q | R Five-membered ring | | R Six-membered ring | |
|---|---|---|---|---|---|
| 76 | MePhSi< | — | — | 7,7' | trimethylsilyl |
| 77 | MePhSi< | — | — | 7,7' | phenyl |
| 78 | MePhSi< | — | — | 7,7' | 1-naphthyl |
| 79 | MePhSi< | — | — | 7,7' | 2-naphthyl |
| 80 | Ph$_2$Si< | — | — | 7,7' | tert-butyl |
| 81 | Ph$_2$Si< | — | — | 7,7' | trimethylsilyl |
| 82 | Ph$_2$Si< | — | — | 7,7' | phenyl |
| 83 | Ph$_2$Si< | — | — | 7,7' | 1-naphthyl |
| 84 | Ph$_2$Si< | — | — | 7,7' | 2-naphthyl |
| 85 | —(CH$_2$)$_4$— | — | — | 7,7' | 1-naphthyl |
| 86 | —(CH$_2$)$_5$— | — | — | 7,7' | 1-naphthyl |
| 87 | —(SiMe$_2$)$_2$— | — | — | 7,7' | 1-naphthyl |
| 88 | —(SiMe$_2$)$_3$— | — | — | 7,7' | 1-naphthyl |
| 89 | —(SiMe$_2$)$_4$— | — | — | 7,7' | 1-naphthyl |
| 90 | Me$_2$Si< | — | — | 6,6' | trimethylsilyl |
| 91 | Me$_2$Si< | — | — | 6,6' | tert-butyl |
| 92 | Me$_2$Si< | — | — | 6,6' | 1-naphthyl |
| 93 | Me$_2$Si< | — | — | 6,6' | 2-naphthyl |
| 94 | Me$_2$Si< | — | — | 6,6' | benzyl |
| 95 | Me$_2$Si< | — | — | 6,6' | phenyldimethylcarbyl |

TABLE 1-continued

Compound represented by the formula [I_A], wherein the compound No. 1, for example, refers to ethylene-1,2-bis(4-indenyl)-zirconium dichloride.

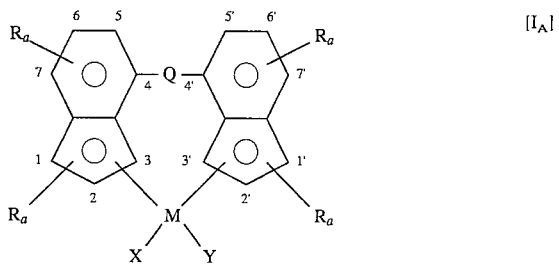

$M = Zr, X = Y = Cl$

| No. | Q | Five-membered ring | | Six-membered ring | |
|---|---|---|---|---|---|
| 96 | Me₂Si< | — | — | 6,6' | 4-tert-butylphenyl |
| 97 | Me₂Si< | — | — | 6,6' | 2,4-dimethylphenyl |
| 98 | Me₂Si< | — | — | 6,6' | 2,4-diisopropylphenyl |
| 99 | Me₂Si< | 2,2' | isopropyl | 7,7' | phenyl |
| 100 | Me₂Si< | 2,2' | tert-butyl | 7,7' | tert-butyl |
| 101 | Me₂Si< | 2,2' | phenyl | 7,7' | phenyl |
| 102 | Me₂Si< | 2,2' | tert-butyl | 7,7' | phenyl |
| 103 | H₂C< | 2,2' | 1-naphthyl | — | — |
| 104 | H₂C< | — | — | 7,7' | 1-naphthyl |
| 105 | Me₂C< | 2,2' | 1-naphthyl | — | — |
| 106 | Me₂C< | 2,2' | tert-butyl | — | — |
| 107 | Me₂C< | 2,2' | trimethylsilyl | — | — |
| 108 | Me₂C< | — | — | 7,7' | 1-naphthyl |
| 109 | Me₂C< | — | — | 7,7' | tert-butyl |
| 110 | Me₂C< | — | — | 7,7' | trimethylsilyl |

TABLE 1

| No. | Q | R (bis) |
|---|---|---|
| 111 | Me₂Si< | a ring formed with the group —CH=CH—CH=CH— at 2, 3 and 2', 3' positions, respectively |
| 112 | Me₂Si< | a ring formed with the group —C(CH₃)=CH—CH=CH— at 2, 3 and 2', 3' positions, respectively |
| 113 | Me₂Si< | a ring formed with the group —CH=CH— at 1, 7, and 1', 7' positions, respectively |
| 114 | Me₂Si< | a ring formed with the group —CH₂CH₂— at 1, 7, and 1', 7' positions, respectively |
| 115 | —CH₂CH₂— | a ring formed with the group —CH=CH— at 1, 7 and 1', 7' positions, respectively |
| 116 | —CH₂CH₂— | a ring formed with the group —CH₂CH₂— at 1, 7, and 1', 7' positions, respectively |
| 117 | Me₂Si< | a ring formed with the group —CH=CH—CH=C(CH₃)— at 6, 7 and 6', 7' positions, respectively |
| 118 | Me₂Si< | 2-methyl, and tert-butyl at 7 and 7' positions, respectively |
| 119 | Me₂Si< | a ring formed with the group —CH=CH—CH=C(CH₃)— at 2, 3 positions; 7'-tert-butyl |
| 120 | Me₂Si< | a ring formed with the group —CH₂CH₂CH₂— at 1, 7 and 1', 7' positions, respectively |

TABLE 2

Compounds represented by the formula [$I_B$], wherein the compound No. 121, for example, refers to dimethylsilylenebis[4-(2-methyl-4,5,6,7-tetrahydroindenyl)-zirconium dichloride.

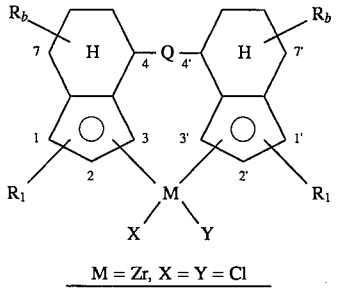

M = Zr, X = Y = Cl

| No. | Q | Five-membered ring | | Six-membered ring | |
|---|---|---|---|---|---|
| 121 | Me₂Si< | 2,2' | — | — | — |
| 122 | Me₂Si< | 2,2' | isopropyl | — | — |
| 123 | Me₂Si< | 2,2' | tert-butyl | — | — |
| 124 | Me₂Si< | 2,2' | phenyl | — | — |
| 125 | Me₂Si< | 2,2' | 1-naphthyl | — | — |
| 126 | Me₂Si< | 2,2' | trimethylsilyl | — | — |
| 127 | Me₂Si< | — | — | 7,7' | phenyl |
| 128 | Me₂Si< | — | — | 7,7' | tert-butyl |
| 129 | Me₂Si< | — | — | 7,7' | methyl |
| 130 | —CH₂CH₂— | — | — | 7',7' 7,7' | methyl ethyl |
| 131 | —CH₂CH₂— | — | — | 7',7' 7,7' | ethyl isopropyl |
| 132 | Me₂Si< | — | — | 7',7' 7,7 | isopropyl methyl |
| 133 | Me₂Si< | — | — | 7',7' 7,7 | isobutyl isobutyl |
| 134 | Me₂Si< | — | — | 7',7' 7,7 | isobutyl n-butyl |
| 135 | Me₂Si< | — | — | 7',7' 7,7 | n-butyl cyclohexyl |
| 136 | Me₂Si< | — | — | 7',7' 7,7 | methyl phenyl |
| 137 | Me₂Si< | 2',2' | methyl | 7',7' 7,7 | phenyl n-butyl |
| 138 | Me₂Si< | 2',2' | ethyl | 7',7' 7,7 | n-butyl isobutyl |
| 139 | Me₂Si< | 2',2' | phenyl | 7',7' 7,7 | isobutyl ethyl |
| 140 | Ph₂Si< | 2',2' | methyl | 7',7' 7,7 | ethyl isobutyl |
| 141 | —CH₂CH₂— | — | — | 7',7' 6,6' 6,6' 7,7' | isobutyl methyl methyl methyl |

TABLE 2-continued

Compounds represented by the formula [I_B], wherein the compound No. 121, for example, refers to dimethylsilylenebis[4-(2-methyl-4,5,6,7-tetrahydroindenyl)-zirconium dichloride.

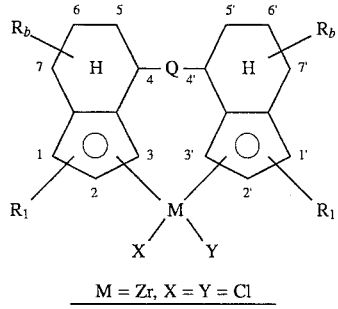

M = Zr, X = Y = Cl

| No. | Q | R Five-membered ring | R Six-membered ring | |
|---|---|---|---|---|
| 142 | —CH₂CH₂— | — | — | 7,7' methyl |
| | | | | 6,6' methyl |
| | | | | 6,6' methyl |
| | | | | 7,7' isobutyl |
| | | | | 7,7' isobutyl |
| 143 | Me₂Si< | — | — | 6,6' methyl |
| | | | | 6,6' methyl |
| | | | | 7,7' methyl |
| | | | | 7,7' methyl |
| 144 | Me₂Si< | — | — | 6,6' methyl |
| | | | | 6,6' methyl |
| | | | | 7,7' isobutyl |
| | | | | 7,7' isobutyl |
| 145 | Me₂Si< | 2,2' | methyl | 6,6' methyl |
| | | | | 6,6' methyl |
| | | | | 7,7' isobutyl |
| | | | | 7,7' isobutyl |

Furthermore, there can be illustrated those compounds of which one or both of the chloride groups have been replaced by other substituents such as bromine, iodine, hydrogen, methyl, phenyl, benzyl, alkoxyamido, alkylsilyl or alkylphosphine groups. There can be also illustrated those compounds of which the zirconium metal has been replaced by titanium or hafnium. Among these compounds, the preferred are those wherein M is titanium, zirconium or hafnium, more preferably titanium or zirconium.

Among these metallocene compounds, the preferred are those having the following substituents:

M: titanium or zirconium;

R's: independently a halogen atom, a hydrocarbon group having 1–14 carbon atoms, a halogen-containing hydrocarbon group having 1–14 carbon atoms, or a silicon-containing hydrocarbon group having 1–14 carbon atoms, with a proviso that when two or more R's are on the identical indenyl or hydroindenyl group, they can be bonded to each other at their ω-terminals to form a ring together with the part of the indenyl or hydroindenyl group.

a's: independently 0 or an integer of 1–3;

b's: independently 0 or an integer of 1–7;

Q: a divalent hydrocarbon group having 1–6 carbon atoms, or a silylene or germylene group having a $C_1$–$C_{12}$ hydrocarbon group;

X, Y: independently a hydrogen atom, a halogen atom, a monovalent hydrocarbon group having 1–20 carbon atoms, or a nitrogen-, oxygen-, silicon- or phosphorus-containing monovalent hydrocarbon group having 1–20 carbon atoms.

More preferable metallocene compounds are those having the following substituents:

M: titanium or zirconium;

R's: independently, a halogen atom, a hydrocarbon group having 1–10 carbon atoms, a halogen-containing hydrocarbon group having 1–10 carbon atoms, or a silicon-containing hydrocarbon group having 1–10 carbon atoms, with a proviso that when two or more R's are on the identical indenyl or hydroindenyl group, they can be bonded to each other at their ω-terminals to form a ring together with the part of the indenyl or hydroindenyl group;

a's: independently 0 or an integer of 1–3;

b's: independently 0 or an integer of 1–7;

Q: a divalent hydrocarbon group having 1–4 carbon atoms, or a silylene or germylene group having haydrocarbon group of 1–7 carbon atoms; and X, Y: independently, a halogen atom, a monovalent hydrocarbon group having 1–10 carbon atoms, or a nitrogen-, oxygen-, silicon-, or phosphorus-containing monovalent hydrocarbon group having 1–10 carbon atoms.

Still more preferable metallocene compounds are those having the following substituents:

M: titanium or zirconium;

R's: independently, a halogen atom, a hydrocarbon group having 1–6 carbon atoms, a halogen-containing hydrocarbon group having 1–7 carbon atoms, or a silicon-containing hydrocarbon group having 1–9 carbon atoms, with a proviso that when two or more R's are on the identical indenyl or hydroindenyl group, they can be bonded to each other at their ω-terminals to form a ring together with the part of the indenyl or hydroindenyl group;

a's: independently 0 or an integer of 1–2;

b's: independently 0 or an integer of 1–4;

Q: a divalent hydrocarbon group having 1–3 carbon atoms, or a silylene or germylene group having haydrocarbon group of 1–7 carbon atoms; and X, Y: independently, a halogen atom, a monovalent hydrocarbon group having 1–6 carbon atoms, or a nitrogen-, oxygen-, silicon-, or phosphorus-containing monovalent hydrocarbon group having 1–6 carbon atoms.

Sites of substitution in the compounds of the formula [I_A] or [I_B], on the other hand, are preferably the position 1, 1', 2, 2', 3 and/or 3' at the 5-membered rings, in order that α-olefin polymers endowed with higher molecular weight or with higher stereoregularity may be obtainable by industrially preferable polymerization at an elevated temperature.

The typical compound among these compounds is the compound represented by the formula [I_A].

<Component (B)>

The Component (B) is (a) an aluminumoxy compound, (b) a Lewis acid or (c) an ionic compound which can react with the Component (A) to convert the Component (A) into a cation.

Some of the Lewis acids can also be regarded as "an ionic compound which can react with the Component (A) to convert the Component (A) into a cation." Thus, a compound belonging to both of "a Lewis acid" and "an ionic compound which can react with the Component (A) to convert the Component (A) into a cation" should be considered to belong to one of the two.

The aluminumoxy compounds (a) specifically include those represented by the formulae [II], [III] or [IV].

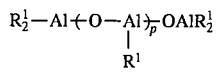   [II]

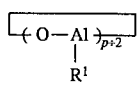   [III]

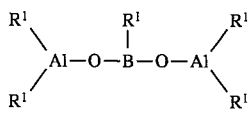   [IV]

wherein p denotes a numeral of 0–40, preferably 2–30, $R^1$'s represent hydrogen or a hydrocarbon group having preferably 1–10 carbon atoms, more preferably 1–6 carbon atoms.

The compounds [II] and [III] are also called alumoxanes, which are obtained by the reaction of a trialkylaluminum or two or more types of a trialkylaluminum with water. Specific examples include (i) products obtained from a trialkylaluminum and water such as methylalumoxane, ethylalumoxane, propylalumoxane, butylalumoxane and isobutylalumoxane, and (ii) products obtained from two types of a trialkylaluminum and water such as methylethylalumoxane, methylbutylalumoxane and methylisobutylalumoxane. Among those, the particularly preferred are methylalumoxane and methylisobutylalumoxane.

These alumoxanes can be used in combination thereof within the group (II) or (III) and/or between the groups of (II) and (III). It is also possible to use these alumoxanes in combination with another alkylaluminum compound such as trimethylaluminum, triethylaluminum, triisobutylaluminum or dimethylaluminum chloride.

These alumoxanes can be prepared under a variety of well-known conditions. Specifically, there can be mentioned the following methods:

(i) a method wherein trialkylaluminum is directly reacted with water in the presence of an appropriate organic solvent such as toluene, benzene or ether;

(ii) a method wherein a trialkylaluminum is reacted with a salt hydrate containing water of crystallization such as a hydrate of copper sulfate or aluminum sulfate;

(iii) a method wherein a trialkylaluminum is reacted with moisture supported on silica gel or the like which has been impregnated with water;

(iv) a method wherein trimethylaluminum and another alkylaluminum e.g. triisobutylaluminum in admixture are directly reacted with water in the presence of an appropriate organic solvent such as toluene, benzene or ether;

(v) a method wherein trimethylaluminum and triisobutylaluminum in admixture are reacted under heating with a salt hydrate containing water of crystallization such as a hydrate of copper sulfate or aluminum sulfate;

(vi) a method wherein silica gel is impregnated with water, treated with triisobutylaluminum, followed by additional treatment with trimethylaluminum;

(vii) a method wherein methylalumoxane and isobutylalumoxane are synthesized by known method, these alkylalumoxanes are admixed in a certain amount and then subjected to reaction under heating; and (viii) a method wherein a salt having water of crystallization such as copper sulfate pentahydrate to an aromatic hydrocarbon solvent such as benzene or toluene and the salt is then reacted with trimethylaluminum at a temperature of about −40° to 40° C. In this case, the amount of water used is in a molar ratio of 0.5–1.5 to trimethylaluminum.

Methylalumoxane thus obtained is a linear or cyclic organoaluminum polymer of formula [II] or [III].

The compound [IV] can be obtained by reacting a trialkylaluminum or two or more trialkylaluminums with a alkylboronic acid represented by the formula

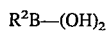

wherein $R^2$ represents a hydrocarbon group having 1–10 carbon atoms, preferably 1–6 carbon atoms, in a molar ratio of 10:1–1:1. Specific examples of the compound of the formula [IV] include (i) a reaction product of trimethylaluminum and methylboronic acid in a ratio of 2:1, (ii) a reaction product of triisobutylaluminum and methylboronic acid in a ratio of 2:1, (iii) a reaction product of trimethylaluminum, triisobutylaluminum and methylboronic acid in a ratio of 1:1:1, (iv) a reaction product of trimethylaluminum and ethylboronic acid in a ratio of 2:1, and (v) a reaction product of triethylaluminum and butylboroic acid in a ratio of 2:1. The compound [IV] can be used as a mixture thereof, and it can also be used in combination with the another alkylaluminum compound such as trimethylaluminum, triethylaluminum, triisobutylaluminum or dimethylaluminum chloride.

The ionic compound (c) which can react with the Component (A) convert the latter into a cation includes a compound represented by the formula:

   [V]

wherein K represents a cationic component having an ionic charge and includes for example a carbonium cation, a tropylium cation, an ammonium cation, an oxonium cation, a sulfonium cation, a phosphonium cation, and the like. There are also mentioned a cation of a metal which tends to be reduced itself or a cation of an organometal. These cations specifically include triphenylcarbonium, diphenylcarbonium, cycloheptatrienium, indenium, triethylammonium, tripropylammonium, tributylammonium, N,N-dimethylanilinium, dipropylammonium, dicyclohexylammonium, triphenylphosphonium, trimethylphosphonium, tri(dimethylphenyl)phosphonium, tri(methylphenyl)phosphonium, triphenylsulfonium, triphenyloxonium, triethyloxonium, pyrilium, a silver ion, a gold ion, a platinum ion, a copper ion, a palladium ion, a mercury ion, a ferrocenium ion, and the like.

Z in the formula [V] represents an anionic component having an ionic charge, which will be a counter anion (generally non-coordinated) against a cationic species derived from the Component (A), and includes for example an organoboron compound anion, an organoaluminum compound anion, an organogallium compound anion, an organophosphorus compound anion, an organoarsenic compound anion, an organoantimony compound anion, and the like. The anionic components specifically include (i) tetraphenylboron, tetrakis(3,4,5-trifluorophenyl)boron, tetrakis(3,5-di(trifluoromethyl)phenyl)boron, tetrakis(3,5-di(tert-butyl)phenyl)boron, tetrakis(pentafluorophenyl)boron, (ii) tetraphenylaluminum, tetrakis(3,4,5-trifluorophenyl)aluminum, tetrakis(3,5-di(trifluoromethyl)phenyl)aluminum, tetrakis(3,5-di(tert-butyl)phenyl)aluminum, tetrakis(pentafluorophenyl)aluminum, (iii) tetraphenylgallium, tetrakis(3,4,5-trifluorophenyl)gallium, tetrakis(3,5-di(trifluoromethyl)phenyl)gallium, tetrakis(3,5-di(tert-butyl)phenyl)gallium, tetrakis(pentafluorophenyl)gallium, (iv) tetraphenylphosphorus, tetrakis(pentafluorophenyl)phosphorus, (v) tetraphenylarsenic, tetrakis(pentafluorophenyl)-arsenic, (vi) tetraphenylantimony, tetrakis(pentafluorophenyl)antimony, (vii) a decaborate, an undecaborate, a carbadodecaborate, a decachlorodecaborate, and the like.

As a Lewis acid (b), particularly the one which can convert the Component (A) into a cation, there are illustrated a variety of organoboron compounds, metal halide compounds, and solid acids. Specifically, there can be mentioned (i) an organoboron compound such as triphenylboron, tris(3,5-difluorophenyl)boron and tris(pentafluorophenyl)boron; (ii) a metal halide compound such as aluminum chloride, aluminum bromide, aluminum iodide, magnesium chloride, magnesium bromide, magnesium iodide, magnesium chlorobromide, magnesium chloroiodide, magnesium bromoiodide, magenesium chloride hydride, magnesium chloride hydroxide, magnesium bromide hydroxide, magnesium chloride alkoxides and magnesium bromide alkoxides, (iii) a solid acid such as silica-alumina and alumina.

These ionic compounds and the Lewis acids can be used solely or in combination with the aluminumoxy compounds represented by the formula [II], [III] or [IV]. These compounds can also be used in combination with an organoaluminum compound such as a tri-lower alkylaluminum, a di-lower alkylaluminum monohalide, a mono-lower alkylaluminum dihalide and a lower alkylaluminum sesquihalide as well as a derivative thereof in which a part of these lower alkyl groups has been replaced by a phenoxy group, examples of which include trimethylaluminum, triethylaluminum, triisobutylaluminum,diethylaluminum phenoxide and dimethylaluminum chloride.

<Making up Catalysts>

The catalyst of the present invention can be prepared by bringing the above described Components (A) and (B) into contact in the presence or absence of a monomer to be polymerized in or outside a polymerization vessel.

The Components (A) and (B) may be used in any suitable amounts in the present invention. For instance, in the case of solvent polymerization, the Component (A) is preferably used in an amount of $10^{-7}$–$10^2$ mmole/liter, more preferably $10^{-4}$–1 mmole/liter based on the transition metal atom. In the case where the Component (B) is the aluminumoxy compound, the molar ratio of Al/transition metal is preferably in the range from 10 or more to 100,000 or less, more preferably from 100 or more to 20,000 or less, particularly from 100 or more to 10,000 or less. On the other hand, when the ionic compound or the Lewis acid is used as the Component (B), the ratio of the Component (B)/the Component (A) on the basis of the transition metal is in the range of 0.1–1,000, preferably 0.5–100, more preferably 1–50.

The catalyst of the present invention can, as described above, contain other components or ingredients in addition to the Components (A) and (B). The third component as an optional ingredient which can be incorporated in addition to the Components (A) and (B) include for example an active hydrogen-containing compound such as $H_2O$, methanol, ethanol and butanol, an electron-donating compound such as an ether, an ester or an amine, and an alkoxy containing compound such as phenyl borate, dimethylmethoxy-aluminum, phenyl phosphite, tetraethoxysilane and diphenyldimethoxysilane.

When these catalysts are used in the polymerization of an olefin, the Components (A) and (B) may be separately introduced into a reaction vessel, or the Components (A) and (B) which have been previously brought into contact with each other may be introduced into a reaction vessel. When the Components (A) and (B) are previously brought into contact with each other, it is also possible to carry out the contact in the presence of a monomer to be polymerized in order to partially polymerize the monomer, that is to subject the catalyst to preliminary polymerization.

It is also possible to bring the Components (A) and (B) and a porous carrier, for example an inorganic porous carrier such as silica, alumina or magnesium chloride, or an organic porous carrier such as polypropylene, polystyrene or polydivinylbenzene into contact in a desired sequence and to use the mixture as a supported catalyst.

<Use of Catalyst/Polymerization of Olefins>

The catalyst according to the present invention can be applied not only to the solvent polymerization with a solvent, but also to the liquid phase solvent-free polymerization, the vapor phase polymerization or the molten polymerization wherein no solvent is substantially used. In addition, it is applied to the continuous polymerization or the batch-wise polymerization.

As the solvent in the solvent polymerization, saturated aliphatic or aromatic hydrocarbons such as hexane, heptane, pentane, cyclohexane, benzene or toluene are used alone or as a mixture thereof.

Polymerization temperature is in the range of from −78° to ca. 200° C., preferably from −20° to 100° C. The pressure of the olefin in the reaction system is not specifically limited, but it is preferably in the range of atmospheric pressure to 50 kg/cm²·G.

During polymerization, it is possible to control the molecular weight by the well-known means such as the selection of temperature or pressure, or the introduction of hydrogen.

α-Olefins to be polymerized with the catalyst of the present invention, that is to say, α-olefins including ethylene used for the polymerization reaction in the process of the present invention, are α-olefins having 2–20 carbon atoms, preferably 2–10 carbon atoms. The α-olefins include specifically propylene, 1-butene, 4-methyl-1-pentene, 1-hexene, 1-octene, 1-decene, 1-dodecene, 1-tetradecene, 1-hexadecene, 1-octadecene, 1-eicocene, and the like. The catalyst of the present invention is preferably used for the polymerization of an α-olefin having 3–10 carbon atoms for the purpose of the stereospecific polymerization, particularly for the polymerization of propylene. These α-olefins can be subjected to polymerization as a mixture thereof.

Furthermore, the catalyst of the present invention can be used for polymerizing the above described higher α-olefin with ethylene, and it can be effectively used also for the copolymerization of the other monomers copolymerizable with the above described α-olefins including conjugated and non-conjugated dienes such as butadiene, 1,4-hexadiene, 7-methyl-1,6-octadiene, 1,8-nonadiene and 1,9-decadiene, and cyclic olefins such as cyclopropene, cyclobutene, cyclopentene, norbornene and dicyclopentadiene.

The present invention is illustrated further specifically with reference to the following non-limitative examples.

EXAMPLE 1

[Synthesis of ethylene-1,2-bis[4-(2,7-dimethylindenyl)]zirconium dichloride (Compound No. 18)]

(1) Synthesis of 1,2-bis[4-(2,7-dimethyl-1-oxoindanyl)]ethane

In 150 ml of methylene chloride, 53.34 g of aluminum chloride was dissolved, and a solution of 16.83 g of 1,2- bis(p-tolyl)ethane and 36.79 g of 2-bromoisobutyryl bromide in 150 ml of methylene chloride was added dropwise at room temperature. After stirring the mixture at room temperature for twenty-four hours, the reaction mixture was poured into ice-water, and 100 ml of concentrated hydrochloric acid was added. After extraction with methylene chloride, the organic layer was washed with water, saturated aqueous sodium hydrogen carbonate and saturated aqueous saline, and dried over magnesium sulfate. The residual concentrate (31.3 g) was dissolved in 300 ml of ethanol, about 1 g of active carbon was added, and the mixture was stirred under reflux for about 5 minutes. After filtration with Celite, the residual concentrate (27.6 g) of the filtrate was purified by silica gel chromatography with a developing solvent of hexane: ethyl acetate=8:1–6:1 to give a fraction containing the aimed product. Ethyl acetate was added to the residual concentrate, the mixture was filtered, and the powdery product obtained was further washed with a solvent mixture solvent of hexane and ethyl acetate (6:1) to give 2.0 g of the title compound.

$^1$H-NMR ($\delta$, CDCl$_3$); ppm: 1.23 (3H, d, J=4.9 Hz), 1.25 (3H, d, J=4.9 Hz), 2.35 (1H, dd, J=4,1 Hz, J=14.6 Hz), 2.41 (1H, dd, J=4,1 Hz, J=14.6 Hz), 2.61 (6H, s), 2.5–2.7 (2H, m), 2.92 (4H, s), 3.14 (1H, dd, J=4.1Hz, J=8.0 Hz), 3.19 (1H, dd, J=4.2 Hz, J=8.0 Hz), 7.05 (2H, d, J=7.7 Hz), 7.20 (1H, d, J=7.4 Hz), 7.21 (1H, d, J=7.7 Hz).

(2) Synthesis of
1,2-bis[4-(1-hydroxy-2,7-dimethylindanyl)]ethane

The powdery product obtained in the preceding reaction (1) (2.0 g) was suspended in a solvent mixture of tetrahydrofuran (20 ml) and methanol (10 ml), and 0.655 g of sodium borohydride was added portionwise to the suspension. After stirring at room temperature overnight, the reaction mixture was poured into water, which was then saturated with sodium chloride, and extracted with ether and methylene chloride. The combined organic layer was washed with dilute hydrochloric acid saturated with sodium chloride and with saturated aqueous saline, and was dried over magnesium sulfate. After the solvent was removed by distillation under reduced pressure, 2.03 g of the concentrated powdery residue was obtained, which was used for the subsequent reaction without further purification.

(3) Synthesis of
1,2-bis[4-(2,7-dimethylindenyl)]ethane

The powdery product obtained in the preceding step (2) (2.03 g) was suspended in 50 ml of toluene, and 0.08 g of p-toluenesulfonic acid was added to the suspension. The reaction mixture was heated to 80°–85° C., and heating was further continued for 6 minutes after the contents had been completely dissolved. After the reaction mixture was allowed to cool, it was poured into water and extracted with toluene. The organic layer was washed with saturated aqueous sodium hydrogen carbonate and saturated aqueous saline, and dried over magnesium sulfate. Toluene was removed by distillation under reduced pressure, the residual concentrate (1.52 g) was washed with a solvent mixture of hexane: ethyl acetate (20:1) to give 1.4 g of the title compound.

Melting point: 164°–167.5° C.;

$^1$H-NMR ($\delta$, CDCl$_3$); ppm: 2.17 (6H, s), 2.37 (6H, s), 2.92 (4H, s), 3.20 (4H, s), 6.59 (2H, q, J=1.5 Hz), 6.91 (2H, d, J=7.7 Hz), 7.00 (2H, d, J=7.7 Hz).

(4) Synthesis of
ethylene-1,2-bis[4-(2,7-dimethylindenyl)]zirconium dichloride

The compound obtained in the preceding step (3) (0.80 g, 2.55 mmole) was suspended in 30 ml of dry diethyl ether, and 3.22 ml of n-butyllithium (1.66M hexane solution) was added dropwise under nitrogen atmosphere at a temperature of –78° C. over a period of 3 minutes. After the addition, the reaction mixture was slowly heated to room temperature.

After the reaction mixture was cooled to –78° C., 0.92 g of zirconium tetrachloride-diethyl ether complex, which contains 2 diethyl ether molecules per zirconium atom, was added over a period of 5 minutes. After the addition, the mixture was gradually warmed to room temperature and stirred for 20 hours.

The reaction mixture was concentrated under reduced pressure, 100 ml of dry methylene chloride was then added to the yellowish white residue obtained, and insolubles were removed by filtration. The filtrate was concentrated to give 0.61 g of pale yellowish brown solids.

It was confirmed by $^1$H-NMR spectrometry that the product was ethylene-1,2-bis[4-(2,7-dimethylindenyl)]zirconium dichloride.

[Copolymerization of ethylene-propylene]

An autoclave equipped with a stirring means of an internal volume of 1.5 liters was purged thoroughly with a mixed gas of ethylene and propylene in a molar ratio of 1:1, and 500 ml of thoroughly desiccated and deoxygenated toluene and 3.4 mmole (0.19 g) of methylalumoxane (manufactured by Toso-Akzo; polymerization degree: 16) based on the Al atom were introduced, followed by 0.47 mg (1 µmole) of the above synthesized ethylene-1,2-bis[4-(2,7-dimethylindenyl)]zirconium dichloride, and polymerization was conducted at 70° C. for 1 hour while ethylene and propylene were introduced at a flow rate of 300 ml/min, respectively. After the polymerization, the solvent was stripped off and the residue was dried to give 50.2 g of a polymer. The catalyst activity was 105,000 g/g of the Component (A). The polymer had a number average molecular weight (Mn) of $6.10 \times 10^4$ based on the polyethylene, a molecular weight distribution (Mw/Mn) of 2.28, and an ethylene content of 73.0 mol %.

EXAMPLE 2

Copolymerization of ethylene with propylene was conducted in the same manner as in Example 1, except that the polymerization was conducted with ethylene and propylene introduced at a flow rate of 300 ml/min and 100 ml/min, respectively, and at a molar ratio of ethylene to propylene of 3.0. As a result, the catalyst activity was 118,000 g/g of Component (A), and an elastomer having a number average molecular weight (Mn) of $8.52 \times 10^4$ and a molecular weight distribution (Mw/Mn) of 2.20 was obtained.

EXAMPLE 3

[Polymerization of ethylene-1-hexene]

Copolymerization of ethylene with 1-hexene was conducted in the same manner as in Example 1, except that polymerization was conducted in an autoclave purged with ethylene, toluene was then introduced followed by introduction of 30 ml of 1-hexene and polymerization was conducted at an ethylene pressure of 7 kg/cm$^2$·G. The catalyst activity obtained was 164,000 g/g of the Component (A), and the copolymer produced had a number average molecular weight (Mn) of $17.2\times10^4$, a molecular weight distribution (Mw/Mn) of 3.12 and a melting point of 112° C.

EXAMPLE 4

Copolymerization of ethylene with 1-hexene was conducted in the same manner as in Example 3, except that polymerization was conducted at a temperature of 95° C. As a result, the catalyst activity obtained was 95,000 g/g of Component (A), and the copolymer produced had a number average molecular weight (Mn) of $13.8\times10^4$, a molecular weight distribution (Mw/Mn) of 3.23 and a melting point of 96.8° C.

EXAMPLE 5

Copolymerization of ethylene with 1-hexene was conducted in the same manner as in Example 3, except that methylalumoxane was replaced by 150 mg (0.76 mmole) of triisobutylaluminum and 0.80 mg (1 μmole) of N,N-dimethylanilinium[tetrakis(pentafluorophenyl)borate].

The catalyst activity obtained was 151,000 g/g of Component (A). The copolymer produced had a number average molecular weight (Mn) of $12.9\times10^4$, a molecular weight distribution (Mw/Mn) of 3.06 and a melting point of 114° C.

EXAMPLE 6

[Polymerization of ethylene]

The procedure for copolymerization of ethylene was followed in Example 3, except that 30 ml of 1-hexene used in Example 3 was omitted.

The catalyst activity was 84,300 g/g of Component (A). The copolymer had a number average molecular weight (Mn) of $15.6\times10^4$, and a molecular weight distribution (Mw/Mn) of 2.91.

Comparative Example 1

Copolymerization of ethylene with 1-hexene was conducted in the same manner as in Example 3, except that ethylene-1,2-bis[4-(2,7-dimethylindenyl)]zirconium dichloride was replaced by ethylene-1,2-bis(1-indenyl)zirconium dichloride and 30 ml of 1-hexene was introduced.

The catalyst activity obtained was 48,700 g/g of Component (A). The copolymer produced had a number average molecular weight (Mn) of $3.46\times10^4$, a molecular weight distribution (Mw/Mn) of 2.37 and a melting point of 115° C.

Comparative Example 2

Copolymerization of ethylene with 1-hexene was conducted in the same manner as in Example 3, except that ethylene-1,2-bis[4-(2,7-dimethylindenyl)]zirconium dichloride was replaced by bis(n-butylcyclopentadienyl)zirconium dichloride and polymerization was carried out at 65° C.

The catalyst activity obtained was 51,800 g/g of the Component (A). The copolymer produced had a number average molecular weight (Mn) of $7.24\times10^4$, a molecular weight distribution (Mw/Mn) of 2.85 and a melting point of 119° C.

EXAMPLE 7

[Synthesis of trimethylene-1,3-bis[(4-(2,7-dimethylindenyl))]zirconium dichloride (Compound No. 48)]

(5) Synthesis of 1,3-bis(p-tolyl)propane

To a solution of 0.97 g of sodium hydroxide in 9.7 ml of water was added 27.1 ml of ethanol. A solution of 2.563 g of p-methylacetophenone in 4 ml of ethanol was added dropwise to the mixture, followed by dropwise addition of a solution of 2.30 g of p-methylbenzaldehyde in 4 ml of ethanol. The resulting mixture was stirred at room temperature for 3.75 hours, and the solid matter was filtered, washed with cold water and ethanol and thoroughly desiccated to give 4.16 g of 4,4'-dimethylchalcone.

To a suspension of 2.14 g of 4,4'-dimethylchalcone in 40 ml of acetic acid was added 0.2 g of 5% palladium on carbon. The reaction vessel was purged with hydrogen gas, and the mixture was vigorously stirred at room temperature for 8.5 hours. The reaction mixture was filtered through Celite, and the filtrate was concentrated to give 2.02 g of the title compound.

$^1$H-NMR (δ, CDCl$_3$); ppm: 1.8–2.0 (2H, m), 2.31 (6H, s), 2.60 (4H, t, J=7,9 Hz), 7.08 (8H, s).

(6) Synthesis of 1,3-bis[4-(2,7-dimethyl-1-oxoindanyl)]propane

To a solution of 5.33 g of aluminum chloride in 10 ml of methylene chloride was added dropwise at room temperature a solution of 1.80 g of 4,4-dimethylchalcone and 3.87 g of 2-bromo-isobutyryl bromide in 20 ml of methylene chloride. After stirring at room temperature for 24 hours, the reaction mixture was poured into ice-water, and 10 ml of concentrated hydrochloric acid was added. The reaction mixture was extracted with methylene chloride, and the organic layer was washed with water, saturated aqueous sodium hydrogen carbonate and saturated aqueous saline, and dried over magnesium sulfate. The residual concentrate (3.4 g) was purified by chromatography on a silica gel column with a developing solvent of hexane: ethyl acetate= 8:1–7:1 to give 0.521 g of the title compound.

$^1$H-NMR (δ, CDCl$_3$); ppm: 1.30 (6H, d, J=7.4 Hz), 1.8–2.2 (2H, m), 2.5–2.8 (8H, m), 2.61 (6H, s), 3.25 (2H, dd, J=7.8 Hz, J=17.0 Hz), 7.07 (2H, d, J=7.6 Hz), 7.27 (2H, d, J=7.6 Hz).

(7) Synthesis of 1,3-bis[4-(1-hydroxy-2,7-dimethylindanyl)]propane

A 0.515 g portion of the compound obtained in the preceding step (6) was suspended in a mixture of 5.2 ml of tetrahydrofuran and 2.6 ml of methanol, and 0.162 g of sodium borohydride was added portionwise. After stirring at room temperature overnight, the reaction mixture was poured into dilute hydrochloric acid, which was then saturated with sodium chloride, and extracted with ether. The organic layer was washed with saturated aqueous saline and dried over magnesium sulfate. The solvent was removed by distillation under reduced pressure, and 0.505 g of the residual concentrate was obtained, which was used in the subsequent reaction without further purification.

(8) Synthesis of 1,3-bis[4-(2,7-dimethylindenyl)]propane

To a suspension of 0.505 g of the compound obtained in the preceding step (7) in 12.6 ml of toluene was added 0.013 g of p-toluenesulfonic acid. The reaction mixture was heated to 50°–55° C., and heating was continued for further 30 minutes after the contents were completely dissolved. After the reaction mixture was allowed to cool, it was poured into water and extracted with toluene. The organic layer was washed with saturated aqueous sodium hydrogen carbonate and saturated aqueous saline, and dried over magnesium sulfate. Toluene was removed by distillation under reduced pressure, the residual concentrate (0.51 g) was purified by silica gel column chromatography to give 0.327 g of the title compound.

Melting point: 112°–115.5° C.;

$^1$H-NMR (δ, CDCl$_3$); ppm: 1.9–2.1 (2H, m), 2.15 (6H, s), 2.36 (6H, s), 2.68 (4H, t, J=7.7 Hz), 3.16 (4H, s), 6.57 (2H, q, J=1.5 Hz), 6.86 (2H, d, J=7.7 Hz), 6.98 (2H, d, J=7.7 Hz).

(9) Synthesis of trimethylene-1,3-bis[4-(2,7-dimethylindenyl)]zirconium dichloride A pale yellow solid product was obtained in an amount of 0.23 g by the same procedure as in "(4) Synthesis of ethylene-1,2-bis[4-(2,7-dimethylindenyl)]zirconium dichloride" in Example 1, except that 1,2-bis[4-(2,7-dimethylindenyl)]ethane was replaced by 0.50 g (1.5 mmole) of 1,3-bis[4-(2,7-dimethylindenyl)]propane.

It was confirmed by $^1$H-NMR spectrometry that the product was trimethylene-1,3-bis[4-(2,7-dimethylindenyl)]zirconium dichloride.

[Copolymerization of ethylene-propylene]

Copolymerization was conducted in the same manner as in Example 1, except that ethylene-1,2-bis[4-(2,7-dimethylindenyl)]zirconium dichloride was replaced by trimethylene-1,3-bis[4-(2,7-dimethylindenyl)]zirconium dichloride. The catalyst activity was 169,000 g/g of Component (A). The copolymer had an ethylene content of 63.7 mole %.

EXAMPLE 8

Polymerization was conducted in the same manner as in Example 3, except that ethylene-1,2-bis[4-(2,7-dimethylindenyl)]zirconium dichloride was replaced by trimethylene-1,3-bis[4-(2,7-dimethylindenyl)]zirconium dichloride. The catalyst activity was 75,600 g/g of Component (A). The copolymer had a number average molecular weight of 108,000, a molecular weight distribution of 3.20 and a melting point of 126° C.

EXAMPLE 9

[Synthesis of dimethylsilylenebis[4-(2-methylindenyl)]zirconium dichloride (Compound No. 27)]

(10) Synthesis of 2-methyl-4-bromo-1-indanone ethylene ketal

To a solution of 4.88 g of 2-methyl-4-bromo-1-indanone derived from 2-bromobenzyl bromide and diethyl methylmalonate in 12 ml of ethylene glycol was added 5.4 ml of ethyl orthoformate. After a catalytic amount of p-toluenesulfonic acid monohydrate was added, the mixture was stirred overnight at room temperature. The reaction mixture was poured into saturated aqueous sodium hydrogen carbonate and extracted with ether. After the organic layer was dried over magnesium sulfate, the solvent was removed by distillation under reduced pressure. The residual concentrate was purified by silica gel column chromatography to give 4.08 g of the title compound.

$^1$H-NMR (δ, CDCl$_3$); ppm: 1.13 (3H, d, J=6.7 Hz), 2.49–2.59 (2H, m), 3.07 (1H, dd, J=10.2 Hz, J=18.8 Hz), 4.05–4.23 (4H, m), 7.11 (1H, dd, J=7.1 Hz, J=7.1 Hz), 7.26 (1H, d, J=7.1 Hz), 7.45 (1H, d, J=7.1 Hz).

(11) Synthesis of bis[4-(2-methyl-1-oxoindanyl)]dimethylsilane 5.42 g of the compound obtained in the preceding step (10) was dissolved in 50 ml of ether under an argon atmosphere. 12.8 ml of a 1.65M solution of n-butyllithium in hexane was added dropwise at –5° C., and the mixture was stirred at a temperature from –8° to –4° C. for 1 hour and 40 minutes. A solution of 1.25 g of dimethyldichlorosilane in 5 ml of hexane was added dropwise at a temperature from –4° to –1° C., and any remaining solution was washed in with 3 ml of hexane. After stirring at –3° C. for 30 minutes, the mixture was stirred overnight at room temperature. The reaction mixture was poured into saturated aqueous saline, extracted with ether and dried over magnesium sulfate, and the solvent was removed by distillation under reduced pressure. The residual concentrate (4.88 g) without further purification was dissolved in 70 ml of acetone, and 0.106 g of p-toluenesulfonic acid monohydrate was added. The mixture was stirred at room temperature for 4 hours. Most of the acetone was removed by distillation under reduced pressure, and the concentrate was poured into saturated aqueous sodium hydrogen carbonate and extracted with ethyl acetate. The organic layer was washed with saturated aqueous saline and dried over sodium sulfate, and the solvent was removed by distillation under reduced pressure. About 4.0 g of the residual concentrate obtained was purified by silica gel chromatography to give 2.87 g of the title compound.

$^1$H-NMR (δ, CDCl$_3$); ppm: 0.71 (6H, s), 1.21 (6H, d, J=7.4 Hz), 2.44, 2.46 (2H, dd, J=17.2 Hz, J=7.2 Hz), 2.54–2.67 (2H, m), 3.13, 3.15 (2H, dd, J=17.6 Hz, J=7.9 Hz), 7.41 (2H, dd, J=7.6 Hz, J=7.5 Hz), 7.74–7.80 (2H, m), 7.81 (2H, d, J=7.7 Hz).

(12) Synthesis of bis[7-(2-methyl-1H-indenyl)]dimethylsilane 3.096 g of the compound obtained in the preceding step (11) was dissolved in a solvent mixture of 31 ml of tetrahydrofuran and 15.5 ml of methanol, and 1.01 g of sodium borohydride was added portionwise at 0° C. Upon completion of the addition, the resulting mixture was stirred at 0° C. for 1 hour and then at room temperature overnight. The reaction mixture was poured into dilute hydrochloric acid, extracted with ethyl acetate, and the organic layer was washed with saturated aqueous saline and dried over sodium sulfate. The solvent was removed by distillation under reduced pressure. The residual concentrate (3.23 g) obtained was, without further purification, dissolved in 81 ml of toluene, 0.084 g of p-toluenesulfonic acid monohydrate was added, and the mixture was stirred at 80° C. for 1 hour. The reaction mixture was cooled, poured into saturated aqueous sodium hydrogen carbonate, extracted with toluene, and the organic layer was washed with saturated aqueous saline and dried over magnesium sulfate. The solvent was removed by distillation under reduced pressure, and the residual concentrate (2.9 g) obtained was purified by silica gel column chromatography to give 2.258 g of the title compound.

Melting point: 91°–93° C.;

$^1$H-NMR (δ, CDCl$_3$); ppm: 0.65 (6H, s), 2.04 (6H, s), 3.02 (4H, s), 6.44 (2H, q, J=1.5 Hz), 7.19–7.29 (6H, m).

(13) Synthesis of dimethylsilylenebis[4-(2-methylindenyl)]zirconium dichloride A pale orange solid product was obtained in an amount of 0.35 g by the same procedure as in "(4) Synthesis of ethylene-1,2-bis[4-(2,7-dimethylindenyl)]zirconium dichloride" in Example 1, except that 1,2-bis[4-(2,7-dimethylindenyl)]ethane was replaced by 0.50 g (1.6 mmole) of bis[7-(2-methyl-1H-indenyl)]dimethylsilane.

It was confirmed by $^1$H-NMR spectrometry that the product was dimethylsilylenebis[4-(2-methylindenyl)]zirconium dichloride.

[Polymerization of ethylene-1-hexene]

Copolymerization of ethylene with 1-hexene was conducted in the same manner as in Example 2, except that ethylene-1,2-bis[4-(2,7-dimethylindenyl)]zirconium dichloride was replaced by dimethylsilylenebis[4-(2-methylindenyl)]zirconium dichloride prepared in the above. As a result, the catalyst activity was 79,200 g/g of Component (A). The copolymer had a number average molecular weight of $20.5 \times 10^4$, a molecular weight distribution 3.18 and a melting point of 106.5° C.

EXAMPLE 10

After an autoclave equipped with a stirring means having an internal volume of 1.5 liters was purged thoroughly with propylene, 500 ml of thoroughly desiccated and deoxygenated toluene and 10 mmole of methylisobutylalumoxane (manufactured by Toso-Akzo, Japan) based on the Al atom were introduced, followed by 0.48 mg (1 μmole) of the above synthesized dimethylsilylenebis[4-(2-methylindenyl)]zirconium dichloride, and polymerization was conducted at 40° C. with a propylene pressure of 7 kg/cm$^2$·G for 2 hours. After the polymerization was completed, the polymer slurry thus obtained were filtered, and a polymer obtained was dried.

As a result, 10.1 g of the polymer was obtained. The catalyst activity was 21,000 g/g of Component (A). The polymer had a number average molecular weight of $6.77 \times 10^4$, and a molecular weight distribution of 2.12. It was found out by the $^{13}$C-NMR spectrometry that the methyltriad fraction (mm) was 76.0 so that the polymer was thus an isotactic polymer.

EXAMPLE 11

[Synthesis of dimethylsilylenebis[4-(1-phenyl-3-methylindenyl)]zirconium dichloride]

(1) Synthesis of ethyl α-ethoxycarbonyl-o-cinnamate (1)

2-Bromobenzaldehyde (74.5 g, 402.6 mmole) was dissolved in benzene (200 ml), and dimethyl malonate (53.2 g, 402.6 mmole) was added thereto. Piperidine (2.6 ml) was added to this solution, and, with a Dien-Stark trap attached to the system, the mixture was heated under reflux for 10 hours to remove water. After benzene was removed under reduced pressure, the residual mixture was distilled for purification to give ethyl α-ethoxycarbonyl-o-cinnamate (109.1 g, 91%).

Melting point: 42°–43° C.;

$^1$H NMR (300 MHz, CDCl$_3$) δ: 3.73 (s, 3H, CO$_2$CH$_3$), 3.88 (s, 3H, CO$_2$CH$_3$), 7.21–7.40 (m, 3H, arom), 7.63 (d, $^3$J=7 Hz, 1H, arom), 8.01 (s, 1H, CH=);

$^{13}$C NMR (75 MHz, CDCl$_3$) δ: 52.49 (OCH$_3$), 52.71 (OCH$_3$), 124.57, 127.42, 127.88, 129.08, 131.28, 133.04, 133.64, 142.25, 163.89 (CO), 166.05 (CO).

(2) Synthesis of ethyl 3-(2-bromophenyl)-2-ethoxycarbonyl-3-methylpropionate (2)

Ethyl α-ethoxycarbonyl-o-cinnamate (50.98 g, 170.5 mmole) and copper bromide (1.0 g) were dissolved in ether (500 ml), and an ethereal solution of methylmagnesium bromide (56.7 ml, 175.6 mmole) was added dropwise to the solution at −20° C. The reaction mixture was then stirred at room temperature overnight. The addition of an aqueous ammonium chloride solution and the separation of layers, and the organic layer was then dried over magnesium sulfate, and the solvent was removed by distillation under reduced pressure to give ethyl 3-(2-bromophenyl)-2-ethoxycarbonyl-3-methylpropionate.

$^1$H NMR (300 MHz, CDCl$_3$) δ: 1.31 (d, $^3$J=7 Hz, 3H, CH$_3$), 3.57 (s, 3H, CO$_2$CH$_3$), 3.75 (s, 3H, CO$_2$CH$_3$), 3.83 (d, $^3$J=10 Hz, 1H, CH(CO$_2$Me)$_2$)), 4.05–4.16 (m, 1H, MeCH), 7.04–7.10 (m, 1H, arom), 7.20–7.30 (m, 2H, arom), 7.51 (d, $^3$J=8 Hz, 1H, arom).

(3) Synthesis of ethyl 3-(2-bromophenyl)-3-methylpropionate (3)

To a solution of crude ethyl 3-(2-bromophenyl)-2-ethoxycarbonyl-3-methyl-propionate (52.96 g, 168.13 mmole) in the mixture of dimethylsulfoxide (250 ml) and water (3 ml) was added lithium chloride (14 g), and the resulting mixture was heated at 150° C. for 2.5 hours. After cooling, dimethylsulfoxide was removed by distillation under reduced pressure, an aqueous sodium chloride solution was added, and the mixture was extracted with ethyl acetate. The organic layer was washed with an aqueous ammonium chloride solution, dried over magnesium sulfate, and the solvent was removed by distillation under reduced pressure. The residual concentrate was further purified by distillation to give ethyl 3-(2-bromophenyl)-3-methylpropionate (28.04 g, 65%).

$^1$H NMR (300 MHz, CDCl$_3$) δ: 1.29 (d, $^3$J=7 Hz, 3H, CH$_3$), 2.51 (dd, $^2$J=5 Hz, $^3$J=9 Hz, 1H, CHH'), 2.71 (dd, $^2$J=5 Hz, $^3$J=9 Hz, 1H, CHH'), 3.65 (s, 3H, CO$_2$CH$_3$), 3.70–3.82 (m, 1H, MeCH), 7.04–7.09 (m, 1H, arom), 7.22–7.31 (m, 2H, arom), 7.55 (d, $^3$J=8 Hz, 1H, arom);

$^{13}$C NMR (75 MHz, CDCl$_3$) δ: 20.44 (CH$_3$), 34.95 (CHCH$_3$), 41.20 (CH$_2$), 51.55 (CO$_2$CH$_3$), 124.24 (q), 126.95, 127.66, 127.79, 133.02, 144.27 (q), 172.32 (CO).

(4) Synthesis of 3-(2-bromophenyl)-3-methylpropionic acid (4)

To a solution of ethyl 3-(2-bromophenyl)-3-methylpropionate (28.04 g, 109.1 mmole) in the mixture of ethanol (200 ml) and water (100 ml) was added potassium hydroxide (12.2 g, 218.2 mmole). The solution was heated under reflux for 5 hours, left standing overnight as it was, the solvent was removed to about half of its original amount, and dilute hydrochloric acid was added to the concentrate. To this mixture was added dichloromethane followed by an aqueous ammonium chloride solution, the layers were separated, and the organic layer was dried over magnesium sulfate. The solvent was removed by distillation under reduced pressure to give 3-(2-bromophenyl)-3-methylpropionic acid (27.97 g, quant.).

$^1$H NMR (300 MHz, CDCl$_3$) δ: 1.32 (d, $^3$J=7 Hz, 3H, CH$_3$), 2.54 (dd, $^2$J=6 Hz, $^3$J=9 Hz, 1H, CHH'), 2.77 (dd, $^2$J=6 Hz, $^3$J=9 Hz, 1H, CHH'), 3.70–3.83 (m, 1H, MeCH), 7.05–7.11 (m, 1H, arom), 7.23–7.29 (m, 2H, arom), 7.56 (d, $^3$J=8 Hz, 1H, arom);

$^{13}$C NMR (75 MHz, CDCl$_3$) δ: 20.36 (CH$_3$), 34.72 (CHCH$_3$), 41.09 (CH$_2$), 124.25 (q), 126.92, 127.74, 127.91, 133.10, 144.00 (q), 178.45 (CO).

(5) Synthesis of 4-bromo-3-methyl-1-indanone (5)

Thionyl chloride (30 ml) was added to 3-(2-bromophenyl)-3-methylpropionic acid (10.36 g, 42.63 mmole), and the mixture was heated under reflux for 1.5 hours. After the excessive amount of the thionyl chloride was removed, a small amount of carbon tetrachloride was added and then removed. The crude acid chloride of the acid (4) thus obtained was dissolved in carbon tetrachloride and added dropwise to the suspension of aluminum chloride (7.4 g, 55.42 mmole) in carbon tetrachloride (60 ml) at 0° C. After the solution was stirred at 0° C. for 30 minutes and then at room temperature overnight, concentrated hydrochloric acid and dichloromethane were added, the layers were separated, and the organic layer was dried over magnesium sulfate. The solvent was removed by distillation under reduced pressure, and the residue was further purified by chromatography on a silica gel column to give 4-bromo-3-methyl-1-indanone (7.71 g, 80%).

Melting point: 39°–40° C.;

$^1$H NMR (300 MHz, CDCl$_3$) δ: 1.43 (d, $^3$J=7 Hz, 3H, CH$_3$), 2.40 (dd, $^2$J=9 Hz, $^3$J=2 Hz, 1H, CHH'), 2.98 (dd, $^2$J=9 Hz, $^3$J=7 Hz, 1H, CHH'), 3.54 (quintet, $^3$J=6 Hz, 1H, MeCH), 7.27 (t, $^3$J=8 Hz, 1H, arom), 7.68 (d, $^3$J=8 Hz, 1H, arom), 7.75 (dd, $^3$J=8 Hz, $^4$J=1 Hz, 1H, arom); $^{13}$C NMR (75 MHz, CDCl$_3$) δ: 20.64 (CH$_3$), 34.01 (CHCH$_3$), 45.63 (CH$_2$), 121.40, 122.64, 129.27, 138.25, 158.26, 205.40 (CO).

(6) Synthesis of dimethylbis[4-(3-methyl-1-oxoindanyl)]silane (7)

p-Toluenesulfonic acid (175 mg, 3 mmole %), ethyl orthoformate (7.6 ml, 46.12 mmole) and ethylene glycol (17.1 ml, 307.5 mmole) were added to 4-bromo-3-methyl-1-indanone (6.918 g, 30.75 mmole), and the mixture was stirred at room temperature overnight. An aqueous sodium hydrogen carbonate solution was added to the reaction mixture, which was extracted with ether and further washed with an aqueous sodium hydrogen carbonate solution several times. The ethereal layer was separated, dried over magnesium sulfate, and the solvent was removed by distillation under reduced pressure to give a crude ketal (6) (8.374 g, quant.). The ketal derivative (6) was dissolved in ether (100 ml), and a solution of n-butyllithium in hexane (20.4 ml, 32.69 mmole) was added thereto dropwise at −5° C. The reaction mixture was stirred at −5° C. for 2.5 hours, dimethyldichlorosilane (1.89 ml, 15.56 mmole) was added thereto, the mixture was further stirred at 0° C. for 1 hour, at room temperature for 2 hours and under reflux for 1 hour, and then left standing overnight. After an aqueous ammonium chloride solution was added, the mixture was separated, the organic layer was dried over magnesium sulfate, and the solvent was removed by distillation under reduced pressure. To the residual concentrate thus obtained were added acetone and p-toluenesulfonic acid, and the mixture was stirred at room temperature for 2.5 hours. The reaction mixture was diluted with an aqueous sodium hydrogen carbonate solution and separated, the organic layer was dried over magnesium sulfate, and the solvent was removed by distillation under reduced pressure. The residual concentrate was purified by chromatography on a silica gel column to give dimethylbis[4-(3-methyl-1-oxoindanyl)]silane (4.05 g, 75%).

$^1$H NMR (300 MHz, CDCl$_3$) δ: major 0.75 (s, 3H, SiCH$_3$), 0.79 (s, 3H, SiCH$_3$), 1.12 (d, $^3$J=7 Hz, 6H, CH$_3$), 2.25 (dd, $^2$J=19 Hz, $^3$J=1 Hz, 2H, CHH'), 2.79 (dd, $^2$J=19 Hz, $^3$J=7 Hz, 2H, CHH'), 3.26 (quintet, $^3$J=7 Hz, 2H, MeCH), 7.37–7.43 (m, 2H, arom), 7.77–7.83 (m, 4H, arom); minor 0.75 (s, 3H, SiCH$_3$), 0.79 (s, 3H, SiCH$_3$), 1.04 (d, $^3$J=7 Hz, 6H, CH$_3$), 2.27 (dd, $^2$J=19 Hz, $^3$J=1 Hz, 2H, CHH'), 2.86 (dd, $^2$J=19 Hz, $^3$J=8 Hz, 2H, CHH'), 3.46 (quintet, $^3$J=7 Hz, 2H, MeCH), 7.37–7.43 (m, 2H, arom), 7.77–7.83 (m, 4H, arom);

$^{13}$C NMR (75 MHz, CDCl$_3$) δ: 0.02 (SiCH$_3$), 0.20 (SiCH$_3$), 1.16 (SiCH$_3$), 24.24 (CH$_3$), 33.92 (CHCH$_3$), 34.08 (CHCH$_3$), 45.77 (CH$_2$), 45.93 (CH$_2$), 125.12, 125.15, 127.12, 127.20, 135.54 (q), 135.58 (q), 141.77, 141.92, 165.92 (q), 206.52 (CO).

(7) Synthesis of dimethylbis[4-(1-phenyl-3-methylindenyl)]silane (8)

To a solution of dimethylbis[4-(3-methyl-1-oxoindanyl)]silane (1.54 g, 4.425 mmole) in a mixture of ether (90 ml) and tetrahydrofuran (9 ml) was added at 0° C. a solution of phenylmagnesium bromide in ether (7.5 ml, 13.28 mmole), and the mixture was stirred at room temperature overnight and then heated under reflux for 2 hours. After the addition of an aqueous ammonium chloride solution, the mixture was separated and the organic layer was dried over magnesium sulfate and concentrated under reduced pressure. Next, toluene (70 ml) and p-toluenesulfonic acid (45 mg, 5 mmole %) were added, and the mixture was stirred at 70° C. for 20 minutes. An aqueous sodium hydrogen carbonate solution was added, the mixture was separated, and the organic layer was dried over magnesium sulfate, concentrated under reduced pressure, and purified by chromatography on a silica gel column to give dimethylbis[4-(1-phenyl-3-methylindenyl)]silane (998 mg, 48%).

$^1$H NMR (300 MHz, CDCl$_3$) δ: major 0.77 (s, 3H, SiCH$_3$), 0.81 (s, 3H, SiCH$_3$), 1.12 (d, $^3$J=7 Hz, 6H, CH$_3$), 3.37–3.48 (m, 2H, MeCH), 6.38 (d, $^3$J=2 Hz, 2H, CH=), 7.15–7.65 (m, 16H, arom); minor 0.80 (s, 6H, SiCH$_3$), 1.11 (d, $^3$J=7 Hz, 6H, CH$_3$), 3.55–3.58 (m, 2H, MeCH), 6.42 (d, $^3$J=2 Hz, 2H, CH=), 7.15–7.65 (m, 16H, arom);

$^{13}$C NMR (75 MHz, CDCl$_3$) δ: 0.24 (SiCH$_3$), 0.52 (SiCH$_3$), 1.31 (SiCH$_3$), 17.31 (CH$_3$), 44.79 (CHCH$_3$), 44.89 (CHCH$_3$), 121.73, 125.77, 125.86, 127.46, 127.78, 128.48, 132.23, 133.37, 136.03 (q), 138.82, 138.86, 142.30 (q), 142.55 (q), 155.70 (q), 156.09 (q).

(8) Synthesis of dimethylsilylenebis[4-(1-phenyl-3-methylindenyl)]zirconium dichloride (9)

All of the following procedures were carried out under the nitrogen atmosphere, and the solvents used were the ones which had been thoroughly desiccated and deoxygenated.

To the solution of dimethylbis[4-(1-phenyl-3-methylindenyl)]silane (8) (670 mg, 1.43 mmole) prepared in the preceding step (7) in toluene (30 ml) was added at 0° C. dropwise a solution of n-butyllithium in hexane (1.74 ml, 2.85 mmole). After stirring at 0° C. for 15 minutes, the mixture was stirred at room temperature for 4 hours, then at 45° C. for 2 hours. The solvent of the reaction mixture was removed by distillation under reduced pressure, and a red solid thus obtained was dissolved in diethyl ether (30 ml). The solution was cooled to −78° C., and zirconium tetrachloride-diethyl ether complex was added slowly. After stirring at −78° C. for 1 hour, the reaction mixture was stirred for further two hours to raise slowly the temperature to room temperature, and further stirred at room temperature for 15 hours.

The solvent of the reaction mixture was then removed by distillation under reduced pressure to form a solid product, to which methylene chloride (40 ml) was added to extract solubles, and the solvent was removed by distillation under reduced pressure. The residue was then recrystallized from methylene chloride-hexane to give a dark violet solid of dimethylsilylenebis[4-(1-phenyl-3-methylindenyl)]zirconium dichloride (9) (yield, 55%).

[Polymerization of propylene]

After an autoclave equipped with a stirring means having an internal volume of 1.5 liter had been thoroughly purged with propylene, toluene (500 ml) which had been desiccated and deoxyganated thoroughly was introduced, followed by methylalumoxane (manufactured by Toso-Akzo Japan, polymerization degree: 16) in an amount of 10 mmole (0.58 g) based on Al atom. After heating to 40° C., dimethylsilylenebis[4-(1-phenyl-3-methylindenyl)]zirconium dichloride (9) (3.1 mg, 5.0 μmole) and then propylene were introduced, and the reaction mixture was subjected to polymerization at 7 kg/cm$^2$G for 1.5 hours. The process product was concentrated to dryness to give a polymer (3.01 g). The product had a heptane soluble fraction in an amount of 0.2 g.

The catalyst activity was 970 g of polymer/g of the complex, and the polymer having the heptane soluble fraction removed therefrom had a number average molecular weight (Mn) of $13.6 \times 10^4$, a molecular weight distribution (Mn/Mw) of 2.13, and a melting point of 158.6° C.

EXAMPLE 12

[Polymerization of propylene]

After an autoclave equipped with a stirring means having an internal volume of 1.5 liter had been thoroughly purged with propylene, toluene (50 ml) which had been desiccated and deoxyganated thoroughly was introduced, followed by methylalumoxane (manufactured by Toso-Akzo Japan, polymerization degree: 16) in an amount of 10 mmole (0.58 g) based on Al atom.

After propylene was introduced in an amount as liquid of 500 ml, the mixture was heated to 70° C. and stirred for 15 minutes, dimethylsilylenebis[4-(1-phenyl-3-methylindenyl)]zirconium dichloride (9) (3.1 mg, 5.0 μmole) was introduced, and the reaction mixture was polymerized for 1.5 hours. The process product was concentrated to dryness to give a polymer (14.2 g).

The catalyst activity was 3,100 g of polymer/g of the complex, and the polymer thus obtained had a number average molecular weight (Mn) of $4.62 \times 10^4$, a molecular weight distribution (Mw/Mn) of 1.94, and a melting point of 155.7° C.

EXAMPLE 13

[Polymerization of propylene]

Propylene was polymerized in the same manner as in Example 11 except that polymerization was carried out at a temperature of 70° C. with the complex in an amount of 6.2 mg (10.0 mmole).

The catalyst activity was 1,600 g of polymer/g of the complex, and the polymer thus obtained had a number average molecular weight (Mn) of $2.18 \times 10^4$, a molecular weight distribution (Mn/Mw) of 2.38, and a melting point of 49.2° C.

EXAMPLE 14

[Copolymerization of ethylene-hexene]

After an autoclave equipped with a stirring means having an internal volume of 1.5 liter had been thoroughly purged with ethylene, toluene (500 ml) which had been desiccated and deoxyganated thoroughly was introduced, followed by 1-hexene (30 ml) which had been desiccated and deoxygenated thoroughly. After methylalumoxane (manufactured by Schering) in an amount of 1.1 mmole based on Al atom was introduced, ethylene was introduced to keep the ethylene pressure at 7 kg/cm$^2$G, the mixture was heated to 100° C. and stirred for 15 minutes. To the reaction system was introduced dimethylsilylenebis[4-(1-phenyl-3-methylindenyl)]zirconium dichloride (9) (0.47 mg, 0.5 μmole), and the reaction mixture was subject to polymerization for 70 minutes.

After ethanol (500 ml) was added to the polymer slurry thus obtained, the mixture was stirred and filtered to separate the polymer in an mount of 13.2 g after drying.

The catalyst activity was 36,000 g of polymer/g of the complex, and the polymer thus obtained had a number average molecular weight (Mn) of $4.42 \times 10^4$, a molecular weight distribution (Mw/Mn) of 2.63, and a melting point of 120.8° C.

EXAMPLE 15

[Synthesis of dimethylsilylenebis(4-indenyl)zirconium dichloride]

(1) Synthesis of dimethyl 2-(2-bromobenzyl)malonate

Sodium pieces (4.9 g) were added to anhydrous methanol (240 ml) at 5°–20° C., and the mixture was stirred at 16° C. for 15 minutes. The solution of dimethyl malonate (66.06 g) in methanol (20 ml) was added dropwise, and any residual dimethyl malonate solution was washed in with methanol (10 ml). After stirring at 20° C. for 20 minutes, a solution of o-bromobenzyl bromide (50 g) in methanol (20 ml) was added dropwise to the reaction mixture while it was cooled in a water bath. Any residual o-bromobenzyl bromide solution was washed in with methanol (10 ml), and the mixture was stirred at room temperature for 1.5 hours and then heated under reflux for 1.5 hours. After the reaction mixture was left standing for cooling, methanol was removed by distillation under reduced pressure, and the residue was poured into ice-hydrochloric acid. The aqueous layer was saturated with saline, extracted with ether, and the organic layer was washed with a saturated aqueous saline and dried over sodium sulfate. The solvent was removed by distillation under reduced pressure, and the residual concentrate in an amount of about 92 g was distilled under reduced pressure (125°–128° C./0.2–0.25 mmHg) to give the title compound (54.25 g).

$^1$H NMR (δ, CDCl$_3$); ppm: 3.35 (2H, d, J=7.9 Hz), 3.70 (6H, s), 3.89 (1H, t, J=7.9 Hz), 7.07–7.13 (1H, m), 7.19–7.26 (2H, m), 7.54 (1H, d, J=7.7 Hz).

(2) Synthesis of methyl 3-(2-bromophenyl)propionate

Dimethyl 2-(2-bromobenzyl)malonate (54.25 g) was dissolved in a mixture of dimethylsulfoxide (220 ml) and water (3.24 ml), and lithium chloride (15.27 g) was added. The mixture was stirred at 160° C. of a bath temperature for 7.5 hours. After the reaction mixture was left standing for cooling, the solvent was removed by distillation under reduced pressure. The residual concentrate was poured into water, extracted with toluene. The organic layer obtained was washed twice with water and once with a saturated aqueous saline, dried over sodium sulfate, the solvent was removed by distillation under reduced pressure, and the residual concentrate was distilled under reduced pressure (96°–98° C./0.5 mmHg) to give the title compound (30.05 g).

$^1$H NMR ($\delta$, $CDCl_3$); ppm: 2.65 (2H, t, J=7.5 Hz), 3.07 (2H, t, J=7.6 Hz), 3.68 (3H, s), 7.05–7.10 (1H, m), 7.20–7.27 (2H, m), 7.53 (1H, d, J=7.6 Hz).

(3) Synthesis of 3-(2-bromophenyl)propionic acid

To a solution of methyl 3-(2-bromophenyl)propionate (35.77 g) in ethanol (80.7 ml) was added at room temperature dropwise a solution of sodium hydroxide (11.77 g) in water (40 ml). After the reaction mixture was stirred under reflux for 2.5 hrs. and left standing for cooling, methanol was removed by distillation under reduced pressure, the residue was poured into ice-hydrochloric acid and stirred for 20 minutes. Crystalline precipitates were filtered, washed well with water, dried under reduced pressure to give the title compound (32.4 g).

$^1$H NMR ($\delta$, $CDCl_3$); ppm: 2.72 (2H, t, J=7.6 Hz), 3.08 (2H, t, J=7.6 Hz), 7.06–7.12 (1H, m), 7.22–7.28 (2H, m), 7.55 (1H, d, J=7.7 Hz).

(4) Synthesis of 4-bromo-1-indanone

Thionyl chloride (85 ml) was added to 3-(2-bromophenyl)propionic acid (16.88 g), and the mixture was stirred under reflux for 2 hours. After the mixture was left standing for cooling, the excessive amount of the thionyl chloride was removed by distillation under reduced pressure, and the residual mixture was distilled azeotropically once with toluene and once with carbon tetrachloride. The residual concentrate was dissolved in carbon tetrachloride (30 ml) and added at a temperature of 5°–10° C. dropwise to a suspension of aluminum chloride (14.74 g) in carbon tetrachloride (100 ml). The mixture was stirred at the same temperature for 40 minutes, then at room temperature for 30 minutes and further under reflux for 1 hour. After left standing for cooling, the mixture was poured into ice-hydrochloric acid, and extracted with methylene chloride. The organic layer was washed with dilute hydrochloric acid, a saturated aqueous sodium hydrogen carbonate solution and a saturated aqueous saline, and dried over sodium sulfate. The solvent was removed by distillation under reduced pressure, and the residual concentrate was purified by chromatography on a silica gel column to give the title compound (13.2 g).

$^1$H NMR ($\delta$, $CDCl_3$); ppm: 2.74 (2H, t, J=6.9 Hz), 3.09 (2H, t, J=6.1 Hz), 7.29 (1H, dd, J=6.9 Hz, 8.3 Hz), 7.71 (1H, d, J=7.7 Hz), 7.77 (1H, d, J=7.7 Hz).

(5) Synthesis of 4-bromo-1-indanol

To a solution of 4-bromo-1-indanone (1.0 g) in a mixture of ethanol (6 ml) and tetrahydrofuran (3 ml) was added sodium borohydride (0.09 g) at an ice temperature. The reaction mixture was stirred at the same temperature overnight and poured into dilute hydrochloric acid, and the aqueous layer was saturated with saline and extracted with ether. The organic layer was washed with a saturated aqueous saline, dried over sodium sulfate, and the solvent was removed by distillation under reduced pressure. The residual concentrate (1.02 g) thus obtained was used for the next reaction without further purification.

$^1$H NMR ($\delta$, $CDCl_3$); ppm: 1.80 (1H, d, J=6.9 Hz), 1.90–2.02 (1H, m), 2.47–2.58 (1H, m), 2.82 (1H, dt, J=16.8 Hz, 6.8 Hz), 3.08 (1H, ddd, J=4.7 Hz, 8.8 Hz, 16.7 Hz), 5.31 (1H, dr, J=6.0 Hz, 6.6 Hz), 7.13 (1H, dd, J=7.1 Hz, 7.1 Hz), 7.35 (1H, d, J=7.4 Hz), 7.43 (1H, d, J=7.8 Hz).

(6) Synthesis of 4-bromo-1-(tertbutyldimethylsiloxy)indane

To a solution of the crude 4-bromo-1-indanol (1.02 g) in dimethylformamide (10 ml) were added at an ice temperature imidazole (0.645 g) and tert-butyldimethylsilyl chloride (0.857 g). The reaction mixture was stirred at the same temperature overnight, poured into a saturated aqueous saline solution and extracted with ether. The organic layer was washed with a saturated aqueous saline, dried over sodium sulfate, and the solvent was removed by distillation under reduced pressure. The residual concentrate (1.6 g) was purified by chromatography on a silica gel column to give the title compound (1.51 g).

$^1$H NMR ($\delta$, $CDCl_3$); ppm: 0.94 (9H, s), 1.86–1.99 (1H, m), 2.39–2.49 (1H, m), 2.74 (1H, dr, J=16.5 Hz, 8.2 Hz), 3.02 (1H, ddd, J=3.0 Hz, 9.1 Hz, 16.4 Hz), 5.30 (1H, t, J=7.1 Hz), 7.09 (1H, dd, J=7.5 Hz, 7.5 Hz), 7.23 (1H, d, J=7.4 Hz), 7.37 (1H, d, J=7.8 Hz).

(7) Synthesis of bis[4-[1-(tert-butyldimethylsiloxy)indanyl]]dimethylsilane

4-Bromo-(1-tert-butyldimethylsiloxy)indane (1.51 g) was dissolved in ether, and the solution was cooled to −72° C. A 2.82 ml portion of a solution of n-butyllithium in hexane (1.64M) was added dropwise, and the mixture was warmed to −20° C. over 6.5 hours. After the mixture was cooled again to −40° C., dimethyldichlorosilane (0.278 ml) was added dropwise, and the mixture was stirred overnight at the same temperature. The reaction mixture was poured into a saturated aqueous saline solution, extracted with ether, and the organic layer was washed with a saturated aqueous saline solution and dried over magnesium sulfate. The residual concentrate (1.55 g) was combined with the one obtained in the same procedure as above (total, 2.70 g), and purified by chromatography on a silica gel column to give a crude product (1.777 g) which contained the title compound as the main component. The product was used for the next reaction without further purification.

(8) Synthesis of bis[7-(1H-indenyl)]dimethylsilane

To a solution of the crude product of bis[4-[1-(tert-butyldimethylsilyloxy)-indanyl]]dimethylsilane (1.777 g) in toluene (53.5 ml) was added p-toluenesulfonic acid monohydrate (0.533 g), and the mixture was stirred in a water bath at 80° C. for 4 hours. The reaction mixture was poured into a saturated aqueous sodium hydrogen carbonate solution, and extracted with ether. The organic layer was washed with a saturated aqueous saline solution, dried over magnesium sulfate, and the solvent was removed by distillation under reduced pressure. The residual concentrate was purified by chromatography on a silica gel column, and further recrystallized from a mixture of hexane and ethyl acetate (200:1) to give the title compound (0.47 g).

$^1$H NMR (δ, CDCl$_3$); ppm: 0.68 (6H, s), 3.08 (4H, dd, J=1.5 Hz, 1.5 Hz), 6.43 (2H, dr, J=5.6 Hz, 2.0 Hz), 6.84 (2H, dr, J=5.6 Hz, 1.9 Hz), 7.29 (2H, dd, J=7.4 Hz, 7.4 Hz), 7.40 (2H, dd, J=7.4 Hz, 1.2 Hz), 7.44 (2H, dd, J=7.4 Hz, 1.2 Hz);

Melting point: 81°–83° C.

(9) Synthesis of dimethylsilylenebis(4-indenyl)zirconium dichloride

All of the following procedures were carried out under the nitrogen atmosphere, and the solvents used were the ones which had been thoroughly desiccated and deoxygenated.

To a solution of bis[7-(1H-indenyl)]dimethylsilane (273 mg, 0.95 mmol) prepared in the preceding step (8) in toluene (15 ml) was added at 0° C. dropwise a 1.64M solution of n-butyllithium in hexane (1.4 ml, 2.3 mmole). After stirring at 0° C. for 5 minutes, the mixture was stirred at room temperature for 12 hours, the toluene was removed by distillation under reduced pressure, and the residue was washed with n-hexane to give the lithium salt of the ligand.

To the lithium salt of the ligand (0.505 g, 1.68 mmole) was added methylene chloride (30 ml). After the mixture was cooled to −78° C., zirconium tetrachloride was added slowly. The reaction mixture was gradually heated to room temperature over 1.5 hours and then stirred at room temperature for 12 hours. The reaction mixture was filtered, and the filtrate was crystallized with hexane added thereto to give 60 mg of dimethylsilylenebis(4-indenyl)zirconium dichloride as a pale yellow solid (yield, 21%).

[Copolymerization of ethylene-hexene]

Copolymerization of ethylene with hexene was carried out for 46 minutes in the same manner as in Example 14, except that dimethylsilylenebis(4-indenyl)zirconium dichloride (0.22 mg, 0.5 μmole) was used as a catalyst.

The catalyst activity was 70,000 g of polymer/g of the complex, and the polymer thus obtained had a number average molecular weight (Mn) of 5.92×10$^4$, a molecular weight distribution (Mw/Mn) of 4.56, and a melting point of 117.3° C.

EXAMPLE 16

[Copolymerization of ethylene-hexene]

Copolymerization of ethylene with hexene was carried out for 90 minutes in the same manner as in Example 14, except that dimethylsilylenebis(4-indenyl)zirconium dichloride (0.22 mg, 0.5 μmole) was used as a catalyst, polymerization temperature was set at 65° C., and hydrogen (30 ml) was introduced before ethylene was introduced.

The catalyst activity was 50,000 g of polymer/g of the complex, and the polymer thus obtained had a number average molecular weight (Mn) of 1.84×10$^4$, a molecular weight distribution (Mw/Mn) of 6.32, and a melting point of 122.6° C.

EXAMPLE 17

[Copolymerization of ethylene-hexene]

Copolymerization of ethylene with hexene was carried out for 25 minutes in the same manner as in Example 14, except that dimethylsilylenebis(4-indenyl)zirconium dichloride (0.31 mg, 0.7 μmole) was used as a catalyst, and 60 ml of 1-hexene was used.

The catalyst activity was 134,000 g of polymer/g of complex, and the polymer thus obtained had a number average molecular weight (Mn) of 2.86×10$^4$, a molecular weight distribution (Mw/Mn) of 7.69, and a melting point of 108.3° C.

EXAMPLE 18

[Synthesis of dimethylsilylenebis[4-(2-tert-butylindenyl)] zirconium dichloride]

(1) Synthesis of 2-tert-butyl-4-bromo-1-indanol

To a solution of 2-tert-butyl-4-bromo-1-indanone in a mixture of methanol (100 ml) and tetrahydrofuran (200 ml) was added sodium borohydride (1.58 g) at room temperature. After stirring at the same temperature, the reaction mixture was poured into dilute hydrochloric acid, and the aqueous layer was saturated with saline and extracted with ether. The organic layer was saturated with a saturated aqueous saline solution, dried over magnesium sulfate, and the solvent was removed by distillation under reduced pressure. The residual concentrate (7.49 g) thus obtained was used for the next reaction without further purification.

$^1$H NMR (δ, CDCl$_3$); ppm: 1.16 (9H, s), 2.02–2.09 (1H, m), 2.90–3.01 (2H, m), 5.20 (1H, dd, J=5.4 Hz, 6.5 Hz), 7.09 (1H, t, J=8.1 Hz), 7.31 (1H, d, J=7.3 Hz), 7.42 (1H, d, J=8.6 Hz).

(2) Synthesis of 2-tert-butyl-4-bromo-1-(tert-butyldimethylsiloxy)indane

The crude product of 2-tert-butyl-4-bromo-1-indanol was dissolved in dimethylformamide (30 ml), and imidazole (1.43 g) and tert-butyl dimethylsilyltrifluoromethylsulfonate (2.65 ml) were added at an ice temperature. After 1 hour, the mixture was heated to 40° C. and stirred for 10 hours. The reaction mixture was poured into a saturated aqueous saline solution and extracted with ether. The organic layer was washed with a saturated aqueous saline solution, dried over sodium sulfate, and the solvent was removed by distillation under reduced pressure. The residual concentrate (4.2 g) was purified by chromatography on a silica gel column to give the title compound (1.97 g).

$^1$H NMR (δ, CDCl$_3$); ppm: 0.08 (3H, s), 0.13 (3H, s), 0.78 (9H, s), 1.11 (9H, s), 1.86–1.94 (1H, m), 2.74–2.82 (1H, dd, J=6.5 Hz, 15.4 Hz), 3.01–3.11 (1H, dd, J=10.5 Hz, 15.4 Hz), 5.21 (1H, d, J=4.3 Hz), 7.00 (1H, t, J=7.3 Hz), 7.21 (1H, d, J=6.8 Hz), 7.36 (1H, d, J=8.1 Hz).

(3) Synthesis of bis[4-[2-tert-butyl-1-(tert-butyldimethylsiloxy) indenyl]]dimethylsilane To the solution of 2-tert-butyl-4-bromo-1-(tert-butyldimethylsiloxy)indane (1.97 g) in diethyl ether (20 ml) was added dropwise a 1.64M solution of n-butyllithium in hexane (3.29 ml), and the mixture was maintained at the temperature for 1 hour, then heated and stirred at 3°–5° C. for 2 hours. Dimethyldichlorosilane (0.303 ml) was added slowly dropwise at the temperature. After 1 hour, the reaction temperature was returned to room temperature, and the reaction mixture was stirred overnight. The reaction mixture was poured into a saturated aqueous saline solution and extracted with ether. The organic layer was washed with a saturated aqueous saline solution and dried over sodium sulfate. The residual concentrate (1.66 g) was a mixture comprising the title compound as the main component and used for the next reaction without further purification.

(4) Synthesis of bis[4-(2-tert-butylindenyl)]dimethylsilane

To a solution of the crude bis[4-[2-tert-butyl-1-(tert-butyldimethyl-silyloxy)indenyl]]dimethylsilane (1.66 g) in toluene (80 ml) was added p-toluenesulfonic acid monohydrate (0.346 g), and the mixture was stirred in a water bath at 80° C. for 30 minutes. The reaction mixture was poured into a saturated aqueous sodium hydrogen carbonate solution, and extracted with ether. The organic layer was washed with a saturated aqueous saline solution, and dried over sodium sulfate. The residual concentrate (0.99 g) was purified by chromatography on a silica gel column to give the title compound (0.56 g).

$^1$H NMR (δ, CDCl$_3$); ppm: 0.69 (6H, s), 1.15 (18H, s), 3.12 (4H, s), 6.48 (2H, s), 7.19–7.32 (6H, m).

(5) Synthesis of dimethylsilylenebis[4-(2-tert-butylindenyl)]zirconium dichloride To a solution of bis[4-(2-tert-butylindenyl)]dimethylsilane (0.48 g, 1.19 mmol) prepared in the preceding step (4) in diethyl ether (10 ml) was added dropwise a 1.64M solution of n-butyllithium in hexane (1.52 ml) at −70° C. After the mixture was maintained at the temperature for 1 hour, it was warmed to room temperature over 1 hour and further stirred for 2 hours. The reaction mixture was cooled again to −70° C., and a diethyl ether slurry (10 ml) containing a zirconium tetrachloride-diethyl ether complex (0.44 g) was added in one portion. After the reaction mixture was maintained at the temperature for 1 hour, it was warmed to room temperature over 1 hour and further stirred for 20 hours. The solvent was removed by distillation under reduced pressure, and the residue was extracted with methylene chloride, and the solvent was removed by distillation under reduced pressure. The residue was washed with n-hexane, and desiccated to give a pale yellow solid (0.33 g). The product was confirmed by the $^1$H NMR spectrometry to be dimethylsilylenebis[4-(2-tert-butylindenyl)]zirconium dichloride in the racemic structure.

$^1$H NMR (δ, CDCl$_3$); ppm: 0.56 (6H, s), 1.18 (18H, s), 4.49 (2H, s), 6.52 (2H, s), 6.97 (2H, dd, J=6.6 Hz, 8.4 Hz), 7.43 (2H, d, J=6.6 Hz), 7.70 (2H, d, J=8.8 Hz).

[Polymerization of propylene]

Propylene was polymerized in the same manner as in Example 11, except that dimethylsilylenebis[4-(1-phenyl-3-methylindenyl)]zirconium dichloride was replaced by dimethylsilylenebis[4-(2-tert-butylindenyl)]zirconium dichloride (2.8 mg, 5.0 μmole). The polymer was obtained in an amount of 1.5 g. The catalyst activity was 540 g of polymer/g of the complex, a number average molecular weight (Mn) of 1.09×10$^4$, a molecular weight distribution (Mw/Mn) of 1.80, and a melting point of 120.6° C.

What is claimed is:

1. A catalyst component for polymerizing an α-olefin comprising a metallocene compound represented by the formulae [I$_A$] or [I$_B$]:

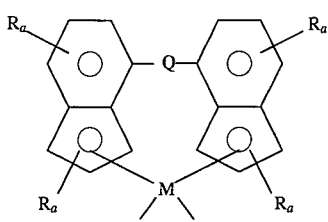

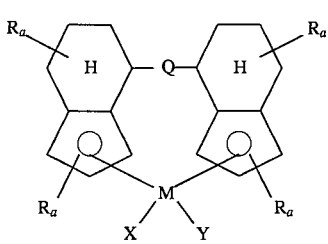

wherein:

M represents a transition metal selected from the group consisting of titanium, zirconium and hafnium;

R's, respectively, represent independently a halogen atom, a hydrocarbon group having 1–20 carbon atoms, a halogen-containing hydrocarbon group having 1–20 carbon atoms, or a silicon-containing hydrocarbon group having 1–20 carbon atoms, with a proviso that, when two or more of R's are on the identical indenyl or hydroindenyl group, two R's are optionally bonded to each other at their ω-terminals to form a ring together with the part of the indenyl or hydroindenyl group;

a's, respectively, denote independently an integer from 0 to 3, and b's, respectively, denote independently an integer from 0 to 7;

Q represents a divalent hydrocarbon or silicon- or germanium-containing hydrocarbon group having 1–30 carbon atoms; and X and Y, respectively, represent independently a hydrogen atom, a halogen atom, or a monovalent hydrocarbon or nitrogen-, oxygen-, silicon- or phosphorus-containing hydrocarbon group having 1–20 carbon atoms.

2. The catalyst component for polymerizing an α-olefin according to claim 1, wherein the metallocene compound represented by the formulae [I$_A$] or [I$_B$] has the following substituents:

M: titanium or zirconium;

R's: independently a halogen atom, a hydrocarbon group having 1–14 carbon atoms, a halogen-containing hydrocarbon having 1–14 carbon atoms, or a silicon-containing hydrocarbon group having 1–14 carbon atoms, with a proviso that, when two or more R's are on the identical indenyl or hydroindenyl group, two R's are optionally bonded to each other at their ω-terminals to form a ring together with the part of the indenyl or hydroindenyl group;

a's: independently 0 or an integer of 1–3;

b's: independently 0 or an integer of 1–7;

Q: a divalent hydrocarbon group having 1–6 carbon atoms, or a silylene or germylene group having a C$_1$–C$_{12}$ hydrocarbon group; and X, Y: independently a hydrogen atom, a halogen atom, a monovalent hydrocarbon group having 1–20 carbon atoms, or a nitrogen-, oxygen-, silicon- or phosphorus-containing monovalent hydrocarbon group having 1–20 carbon atoms.

3. A catalyst component for polymerizing an α-olefin according to claim 2, wherein the metallocene compound represented by the formulae [$I_A$] or [$I_B$] has the following substituents:

M: titanium or zirconium;

R's: independently, a halogen atom, a hydrocarbon group having 1–10 carbon atoms, a halogen-containing hydrocarbon group having 1–10 carbon atoms, or a silicon-containing hydrocarbon group having 1–10 carbon atoms, with a proviso that when two or more R's are on the identical indenyl or hydroindenyl group, two R's are optionally bonded to each other at their ω-terminals to form a ring together with the part of the indenyl or hydroindenyl group;

a's: independently 0 or an integer of 1–3;

b's: independently 0 or an integer of 1–7;

Q: a divalent hydrocarbon group having 1–4 carbon atoms, or a silylene or germylene group having hydrocarbon group of 1–7 carbon atoms; and X, Y: independently, a halogen atom, a monovalent hydrocarbon group having 1–10 carbon atoms, or a nitrogen-, oxygen-, silicon-, or phosphorus-containing monovalent hydrocarbon group having 1–10 carbon atoms.

4. The catalyst component for polymerizing an α-olefin according to claim 1, wherein the metallocene compound represented by the formula [$I_A$] or [$I_B$] has the following substituents:

M: titanium or zirconium;

R's: independently, a halogen atom, a hydrocarbon group having 1–6 carbon atoms, a halogen-containing hydrocarbon group having 1–7 carbon atoms, or a silicon-containing hydrocarbon group having 1–9 carbon atoms, with a proviso that when two or more R's are on the identical indenyl or hydroindenyl group, two R's are optionally bonded to each other at their ω-terminals to form a ring together with the part of the indenyl or hydroindenyl group;

a's: independently 0 or an integer of 1–2;

b's: independently 0 or an integer of 1–4;

Q: a divalent hydrocarbon group having 1–3 carbon atoms, or a silylene or germylene group having hydrocarbon group of 1–7 carbon atoms; and X, Y: independently, a halogen atom, a monovalent hydrocarbon group having 1–6 carbon atoms, or a nitrogen-, oxygen-, silicon-, or phosphorus-containing monovalent hydrocarbon group having 1–6 carbon atoms.

5. The catalyst component for polymerizing an α-olefin according to claim 1, wherein the metallocene compound is a compound represented by the formula [$I_A$].

6. A catalyst for polymerizing an α-olefin which comprises a combination of Component (A) which is a catalyst component for polymerizing an α-olefin according to claim 1 and Component (B) which is (i) an aluminumoxy compound, (ii) a Lewis acid, or (iii) an ionic compound capable of reacting with the Component (A) to convert the Component (A) into a cation.

7. The catalyst for polymerizing an α-olefin according to claim 6, wherein the aluminumoxy compound of the Component (B) is the compound represented by the formulae [II], [III] or [IV]:

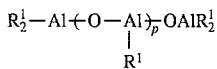 [II]

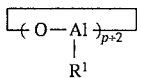 [III]

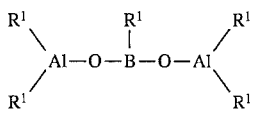 [IV]

wherein p denotes a numeral of 0–40, and $R^1$ represents a hydrogen atom or a hydrocarbon group.

8. The catalyst for polymerizing an α-olefin according to claim 7, wherein $R^1$'s, which may be the same or different, represent a hydrocarbon group having 1–10 carbon atoms.

9. The catalyst for polymerizing an α-olefin according to claim 7, wherein the compound [II] or [III] of the ingredient (B) is combined with another organoaluminum compound.

10. The catalyst for polymerizing an α-olefin according to claim 6, wherein the Lewis acid of the Component (B) is an organoboron compound or a metal halide compound.

11. The catalyst for polymerizing an α-olefin according to claim 7, wherein the ionic compound of the Component (B) which is capable of reacting with the Component (A) to convert the Component (A) into a cation is a compound represented by the formula [V]:

$$[K]^{e+} [Z]^{e-} \qquad [V]$$

wherein K represents a cationic component having an ionic charge, and Z represents an anionic component having an ionic charge, which will be a counter anion against a cationic species derived from the Component (A).

12. The catalyst for polymerizing an α-olefin according to claim 11, wherein K is a member selected from the group consisting of a carbonium cation, a tropylium cation, an ammonium cation, an oxonium cation, a sulfonium cation, a phosphonium cation, a cation of a metal which is selected from the group consisting of silver, gold, platinum, copper palladium and mercury and a cation of an organometal.

13. The catalyst for polymerizing an α-olefin according to claim 11, wherein Z represents a member selected from the group consisting of an organoboron compound anion, an organoaluminum compound anion, an organogallium compound anion, an organophosphorus compound anion, and an organoarsenic compound anion.

14. A process for producing an α-olefin polymer which comprises contacting an α-olefin with a catalyst as claimed in claim 6 thereby to polymerize the α-olefin.

* * * * *

UNITED STATES PATENT AND TRADEMARK OFFICE
CERTIFICATE OF CORRECTION

PATENT NO. : 5,594,081
DATED : January 14, 1997
INVENTOR(S) : Uchino, et. al.

It is certified that error appears in the above-identified patent and that said Letters Patent is hereby corrected as shown below:

Column 44, lines 10-19,

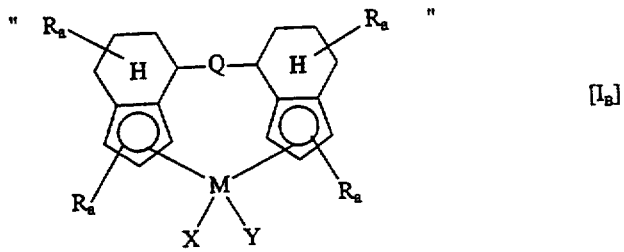

should read

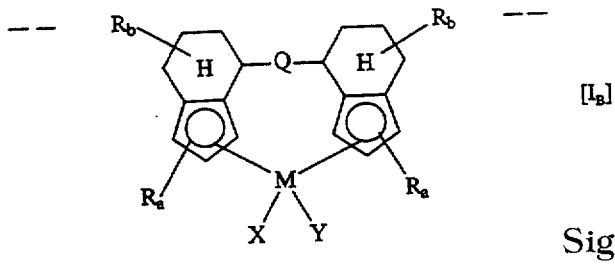

Signed and Sealed this

Twenty-seventh Day of February, 2001

Attest:

NICHOLAS P. GODICI

Attesting Officer     Acting Director of the United States Patent and Trademark Office